United States Patent
Ali et al.

(10) Patent No.: US 12,082,135 B2
(45) Date of Patent: Sep. 3, 2024

(54) REPEATER CONFIGURATION FOR INITIAL ACCESS

(71) Applicant: Lenovo (Singapore) Pte. Ltd., New Tech Park (SG)

(72) Inventors: Ali Ramadan Ali, Munich (DE); Ankit Bhamri, Rödermark (DE); Sher Ali Cheema, Ilmenau (DE); Ahmed Hindy, Aurora, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 255 days.

(21) Appl. No.: 17/510,209

(22) Filed: Oct. 25, 2021

(65) Prior Publication Data

US 2023/0130003 A1    Apr. 27, 2023

(51) Int. Cl.
*H04W 56/00* (2009.01)
*H04W 16/28* (2009.01)
*H04W 74/0833* (2024.01)
*H04W 76/10* (2018.01)

(52) U.S. Cl.
CPC ........ *H04W 56/001* (2013.01); *H04W 16/28* (2013.01); *H04W 74/0833* (2013.01); *H04W 76/10* (2018.02)

(58) Field of Classification Search
CPC .............. H04W 16/28; H04W 56/001; H04W 74/0833; H04W 76/10
See application file for complete search history.

(56) References Cited

U.S. PATENT DOCUMENTS

| | | | |
|---|---|---|---|
| 2020/0351924 A1* | 11/2020 | Seo | H04L 5/0053 |
| 2021/0037459 A1 | 2/2021 | Li et al. | |
| 2021/0067237 A1 | 3/2021 | Sampath et al. | |
| 2021/0068050 A1 | 3/2021 | Sampath et al. | |
| 2021/0298069 A1 | 9/2021 | Abedini et al. | |
| 2022/0045808 A1* | 2/2022 | Abedini | H04B 7/15528 |
| 2022/0053433 A1* | 2/2022 | Abedini | H04W 16/28 |
| 2022/0060997 A1* | 2/2022 | Dinan | H04L 27/18 |

(Continued)

OTHER PUBLICATIONS

PCT/IB2022/060253, "Notification of Transmittal of the International Search Report and the Written Opinion of the International Searching Authority, or the Declaration", International Searching Authority, Jan. 20, 2023, pp. 1-12.

(Continued)

*Primary Examiner* — Jungwon Chang
(74) *Attorney, Agent, or Firm* — Kunzler Bean & Adamson

(57) ABSTRACT

Apparatuses, methods, and systems are disclosed for repeater configuration for initial access. An apparatus includes a transceiver that that receives an initial setup configuration from a base station of a mobile wireless communication network for establishing a forwarding link with a user equipment ("UE") device, receives an initial access configuration from the base station, the initial access configuration comprising one or more configuration parameters that allow the UE to establish access to the mobile wireless communication network, and transmits feedback to the base station that indicates reception of one or more of the initial setup configuration and the initial access configuration.

17 Claims, 15 Drawing Sheets

(56) References Cited

U.S. PATENT DOCUMENTS

2023/0308877 A1* 9/2023 Morchon ............ H04W 12/108 713/176

OTHER PUBLICATIONS

3GPP, "3rd Generation Partnership Project; Technical Specification Group Radio Access Network; NR; Base Station (BS) radio transmission and reception (Release 17)", 3GPP TS 38.104 V17.3.0, Nov. 2021, pp. 1-319.

3GPP, "3rd Generation Partnership Project; Technical Specification Group Radio Access Network; NR; Medium Access Control (MAC) protocol specification (Release 16)", 3GPP TS 38.321 V16.6.0, Nov. 2021, pp. 1-158.

3GPP, "3rd Generation Partnership Project; Technical Specification Group Radio Access Network; NR; Multiplexing and channel coding (Release 16)", 3GPP TS 38.212 V16.7.0, Nov. 2021, pp. 1-153.

3GPP, "3rd Generation Partnership Project; Technical Specification Group Radio Access Network; NR; Physical channels and modulation (Release 16)", 3GPP TS 38.211 V16.7.0, Nov. 2021, pp. 1-134.

3GPP, "3rd Generation Partnership Project; Technical Specification Group Radio Access Network; Physical layer procedures for shared spectrum channel access (Release 16)", 3GPP TS 37.213 V16.6.0, Jun. 2021, pp. 1-27.

3GPP, "3rd Generation Partnership Project; Technical Specification Group Radio Access Network; NR; Physical layer procedures for control (Release 16)", 3GPP TS 38.213 V16.7.0, Nov. 2021, pp. 1-188.

3GPP, "3rd Generation Partnership Project; Technical Specification Group Radio Access Network; NR; Physical layer procedures for data (Release 16)", 3GPP TS 38.214 V16.7.0, Nov. 2021, pp. 1-172.

3GPP, "3rd Generation Partnership Project; Technical Specification Group Radio Access Network; NR; Radio Resource Control (RRC) protocol specification (Release 16)", 3GPP TS 38.331 V16.6.0, Nov. 2021, pp. 1-961.

3GPP, "3rd Generation Partnership Project; Technical Specification Group Radio Access Network; NR; Requirements for support of radio resource management (Release 17)", 3GPP TS 38.133 V17.3.0, Nov. 2021, pp. 1-3207.

3GPP, "3rd Generation Partnership Project; Technical Specification Group Radio Access Network; NR; User Equipment (UE) radio transmission and reception; Part 1: Range 1 Standalone (Release 17)", 3GPP TS 38.101-1 V17.3.0, Nov. 2021, pp. 1-580.

* cited by examiner

REPEATER CONFIGURATION FOR INITIAL ACCESS

FIELD

The subject matter disclosed herein relates generally to wireless communications and more particularly relates to repeater configuration for initial access.

BACKGROUND

In wireless networks, repeaters can be used to receive and transmit signals to boost reception within the wireless network. Smart repeaters may be used to extend network coverage in both uplink and downlink communication with the help of more control information from the network for efficient amplify and forward mechanism that make use of time and spatial information of the Uu link. However, signalling this control information for each time slot may put a large burden on the control signalling overhead. Furthermore, for initial access, applying synchronization signal block ("SSB") sweeping only at the base station side, reduces the footprint of the smart repeater coverage, or necessities using omni directional transmission at the smart repeater to cover as many UEs as possible, since the smart repeater can only receive some of the SSB beams

BRIEF SUMMARY

Disclosed are procedures for repeater configuration for initial access. Said procedures may be implemented by apparatus, systems, methods, and/or computer program products.

In one embodiment, a repeater node apparatus includes a transceiver that receives an initial setup configuration from a base station of a mobile wireless communication network for establishing a forwarding link with a user equipment ("UE") device, receives an initial access configuration from the base station, the initial access configuration comprising one or more configuration parameters that allow the UE to establish access to the mobile wireless communication network, and transmits feedback to the base station that indicates reception of one or more of the initial setup configuration and the initial access configuration.

In one embodiment, a method of a repeater node includes receiving an initial setup configuration from a base station of a mobile wireless communication network for establishing a forwarding link with a user equipment ("UE") device, receiving an initial access configuration from the base station, the initial access configuration comprising one or more configuration parameters that allow the UE to establish access to the mobile wireless communication network, and transmitting feedback to the base station that indicates reception of one or more of the initial setup configuration and the initial access configuration.

In one embodiment, a base station apparatus includes a transceiver that transmits an initial setup configuration to a repeater node for establishing a forwarding link with a user equipment ("UE") device, transmits an initial access configuration to the repeater node, the initial access configuration comprising one or more configuration parameters that allow the UE to establish access to a mobile wireless communication network via the repeater node, and receives feedback from the repeater node that indicates reception of one or more of the initial setup configuration and the initial access configuration.

In one embodiment, a method of a base station apparatus includes transmitting an initial setup configuration to a repeater node for establishing a forwarding link with a user equipment ("UE") device, transmitting an initial access configuration to the repeater node, the initial access configuration comprising one or more configuration parameters that allow the UE to establish access to a mobile wireless communication network via the repeater node, and receiving feedback from the repeater node that indicates reception of one or more of the initial setup configuration and the initial access configuration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
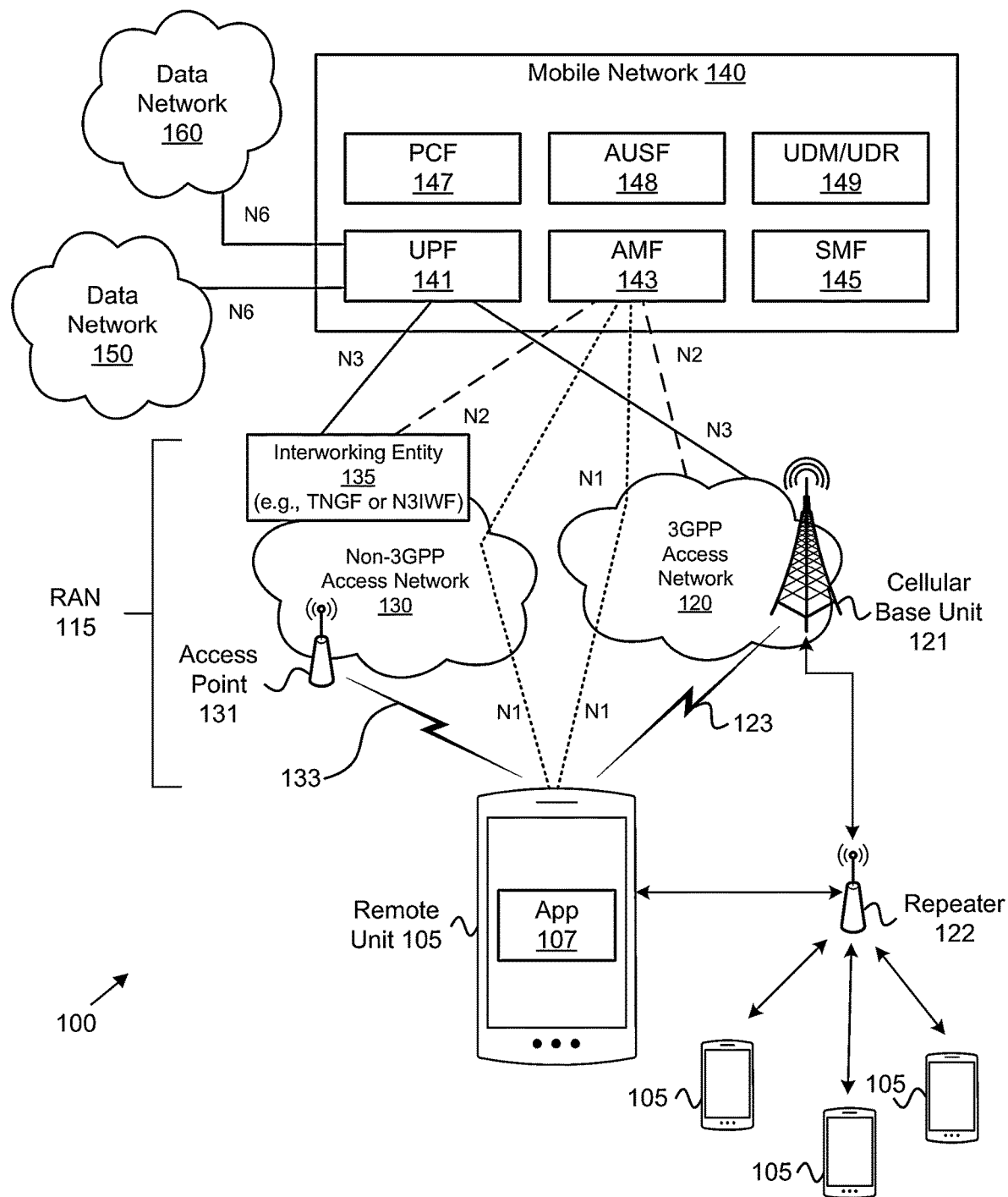
FIG. 1 is a schematic block diagram illustrating one embodiment of a wireless communication system for repeater configuration for initial access.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-largescale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for repeater configuration for initial access. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Smart repeaters are currently gaining a momentum in Rel18 discussions. This new type of RF repeaters aims at extending the network coverage in both uplink and downlink communication with the help of more control information from the network for efficient amplify and forward mechanism that make use of time and spatial information of the Uu link. This information may include time division duplex ("TDD") switching as well as common and UE dedicated spatial information for beamforming. However, signaling this control information for each time slot may put a large burden on the control signaling overhead. Furthermore, for initial access, applying SSB sweeping only at the base station side, reduces the footprint of the smart repeater coverage, or necessities using omni directional transmission at the smart repeater to cover as many UEs as possible, since the smart repeater can only receive some of the SSB beams.

In this disclosure, methods are proposed to configure the smart repeater with the SSB and PRACH configuration. Since the transmission of SSB and PRACH follow certain patterns of SSB locations and RACH occasions, these configuration parameters can be sent in advance to the smart repeater before starting the SSB transmission and remain valid for multiple SSB burst sets, such that avoiding sending time and spatial information for each DL and UL slots during the initial access.

In one embodiment, the subject matter disclosed herein describes sending an initial configuration to the repeater on a repeater control link, which may include operation carrier frequency to switch on the corresponding RF circuit, BW (e.g., initial BWP) to switch on the suitable RF filter at the repeater, and TDD information for the initial access DL/UL.

In one embodiment, the subject matter disclosed herein describes sending SSB configuration to the repeater on the repeater control link, which may include time information of the SSBs locations in SSB burst, and in SSB burst set, beam translation/mapping between BS SSB beams and smart repeater forwarded SSB beams, and information of the transmission angle for each SSB beam from the repeater as an offset to the reference angle (LoS angle between the BS and the repeater).

In one embodiment, the subject matter disclosed herein describes sending time domain information related to PRACH, which may include sending PRACH index to extract time related information of preamble transmission that include PRACH slots, number of PRACHs in a slot, starting symbols, etc., and time domain information of RACH Occasions ("ROs") for PRACH transmission associated with the SSB indices.

FIG. 1 depicts a wireless communication system 100 for repeater configuration for initial access, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a Third Generation Partnership Project ("3GPP") access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one embodiment, the wireless communication system 100 may include a repeater 122, which may be embodied as a network node or device that is configured to extend the coverage of the wireless communication system 100 by repeating, amplifying, forwarding, and/or the like signals between the base unit 121 and a remote unit 105, e.g., a UE. The repeater 122 may include a bi-directional signal amplifier to extend the coverage of a wireless signal in both an uplink and downlink direction. In certain embodiments, the repeater 122 is transparent to the remote unit 105 such that the remote unit 105 communicates via the repeater 122 as if it were communicating directly with the base unit 121. In such an embodiment, there is no need for an access procedure between the remote unit 105 and the repeater 122.

In one implementation, the RAN 120 is compliant with the 5G system specified in the 3GPP specifications. For example, the RAN 120 may be a NextGen RAN ("NG-RAN"), implementing NR Radio Access Technology ("RAT") and/or Long Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as User Equipments ("UEs"), subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the cellular base units 121 in the 3GPP access network 120 via UL and DL communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or Packet Data Network ("PDN") connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a PDN connection (also referred to as EPS session) provides E2E UP connectivity between the remote unit and a PDN. The PDN connectivity procedure establishes an EPS Bearer, i.e., a tunnel between the remote unit 105 and a Packet Gateway ("P-GW"), not shown, in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art.

The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the Access and Mobility Management Function ("AMY") 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane functions including, but not limited to, an AMF 143 that serves the 5G-RAN 115, a Session Management Function ("SMF") 145, a Policy Control Function ("PCF") 147, an Authentication Server Function ("AUSF") 148, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 147 is responsible for unified policy framework, providing policy rules to Control Plane ("CP") functions, access subscription information for policy decisions in UDR. The AUSF 148 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single Network Slice Selection Assistance Information ("S-NSSAI"), while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as a Mobility Management Entity ("MIME"), Serving Gateway ("S-GW"), P-GW, Home Subscriber Server ("HSS"), and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfox, and the like. For example, in an 4G/LTE variant involving an EPC, the AMF 143 may be mapped to an MME, the SMF mapped to a control plane portion of a P-GW and/or to an MME, the UPF 141 may be mapped to an S-GW and a user plane portion of the P-GW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As background, regarding cell search and supported numerologies for SSB, e.g., in TS 38.213, cell search is the procedure for a UE to acquire time and frequency synchronization with a cell and to detect the physical layer Cell ID of the cell.

A UE receives the following synchronization signals ("SS") in order to perform cell search: the primary synchronization signal ("PSS") and secondary synchronization signal ("SSS"), e.g., as defined in TS 38.211.

A UE assumes that reception occasions of a physical broadcast channel ("PBCH"), PSS, and SSS are in consecutive symbols, as defined in TS 38.211, and form a SS/PBCH block. The UE assumes that SSS, PBCH DM-RS, and PBCH data have same EPRE. The UE may assume that the ratio of PSS EPRE to SSS EPRE in a SS/PBCH block is either 0 dB or 3 dB. If the UE has not been provided dedicated higher layer parameters, the UE may assume that the ratio of physical downlink control channel ("PDCCH") demodulation reference signal ("DMRS") energy per resource element ("EPRE") to secondary synchronization signal ("SSS") EPRE is within −8 dB and 8 dB when the UE monitors PDCCHs for a DCI format 1_0 with CRC scrambled by SI-RNTI, P-RNTI, or RA-RNTI.

For a half frame with SS/PBCH blocks, the first symbol indexes for candidate SS/PBCH blocks are determined according to the SCS of SS/PBCH blocks as follows, where index 0 corresponds to the first symbol of the first slot in a half-frame.

Case A—15 kHz SCS: the first symbols of the candidate SS/PBCH blocks have indexes of $\{2, 8\}+14 \cdot n$
  For operation without shared spectrum channel access:
    For carrier frequencies smaller than or equal to 3 GHz, n=0, 1.
    For carrier frequencies within FR1 larger than 3 GHz, n=0, 1, 2, 3.
  For operation with shared spectrum channel access, e.g., as described in TS 37.213, n=0, 1, 2, 3, 4.

Case B—30 kHz SCS: the first symbols of the candidate SS/PBCH blocks have indexes $\{4, 8, 16, 20\}+28 \cdot n$. For carrier frequencies smaller than or equal to 3 GHz, n=0. For carrier frequencies within FR1 larger than 3 GHz, n=0,1.

Case C—30 kHz SCS: the first symbols of the candidate SS/PBCH blocks have indexes $\{2,8\}+14 \cdot n$.
  For operation without shared spectrum channel access
    For paired spectrum operation
      For carrier frequencies smaller than or equal to 3 GHz, n=0,1. For carrier frequencies within FR1 larger than 3 GHz, n=0, 1, 2, 3.
    For unpaired spectrum operation without shared spectrum channel access
      For carrier frequencies smaller than or equal to 2.4 GHz, n=0, 1. For carrier frequencies within FR1 larger than 2.4 GHz, n=0, 1, 2, 3.
  For operation with shared spectrum channel access, n=0, 1, 2, 3, 4, 5, 6, 7, 8, 9.

Case D-120 kHz SCS: the first symbols of the candidate SS/PBCH blocks have indexes $\{4, 8,16, 20\}+28 \cdot n$ For carrier frequencies within FR2, n=0, 1, 2, 3, 5, 6, 7, 8, 10, 11, 12, 13, 15, 16, 17, 18.

Case E-240 kHz SCS: the first symbols of the candidate SS/PBCH blocks have indexes $\{8, 12, 16, 20, 32, 36, 40, 44\}+56n$. For carrier frequencies within FR2, n=0, 1, 2, 3, 5, 6, 7, 8.

From the above cases, if the subcarrier spacing ("SCS") of SS/PBCH blocks is not provided by ssbSubcarrierSpacing, the applicable cases for a cell depend on a respective frequency band, e.g., as provided in TS 38.101-1 and TS 38.101-2. A same case applies for all SS/PBCH blocks on the cell. If a 30 kHz SS/PBCH block SCS is indicated by ssbSubcarrierSpacing, Case B applies for frequency bands with only 15 kHz SS/PBCH block SCS, e.g., as specified in TS 38.101-1, and the case specified for 30 kHz SS/PBCH block SCS in TS 38.101-1 applies for frequency bands with 30 kHz SS/PBCH block SCS or both 15 kHz and 30 kHz SS/PBCH block SCS, e.g., as specified in TS 38.101-1. For a UE configured to operate with carrier aggregation over a set of cells in a frequency band of FR2 or with frequency-contiguous carrier aggregation over a set of cells in a frequency band of FR1, if the UE is provided SCS values by ssbSubcarrierSpacing for receptions of SS/PBCH blocks on any cells from the set of cells, the UE expects the SCS values to be same.

The candidate SS/PBCH blocks in a half frame are indexed in an ascending order in time from 0 to $L_{max}-1$, where for operation without shared spectrum channel access, $\overline{L}_{max} = L_{max}$, and $L_{max}$ is as described in TS 38.104 for operation with shared spectrum channel access,
$\overline{L}_{max} = 10$ for 15 kHz SCS of SS/PBCH blocks, and
$\overline{L}_{max} = 20$ for 30 kHz SCS of SS/PBCH blocks For $\overline{L}_{max} = 4$, a UE determines the 2 LSB bits of a candidate SS/PBCH block index per half frame from a one-to-one mapping with an index of the DM-RS sequence transmitted in the PBCH as described in TS 38.211.

For $\overline{L}_{max} > 4$, a UE determines the 3 LSB bits of a candidate SS/PBCH block index per half frame from a one-to-one mapping with an index of the DM-RS sequence transmitted in the PBCH as described in TS 38.211.

for $\overline{L}_{max} = 10$, the UE determines the 1 MSB bit of the candidate SS/PBCH block index from PBCH payload bit $\bar{a}_{\bar{A}+7}$ as described in TS 38.212;

for $\overline{L}_{max} = 20$, the UE determines the 2 MSB bits of the candidate SS/PBCH block index from PBCH payload bits $\bar{a}_{\bar{A}+6}$, $\bar{a}_{\bar{A}+7}$ as described in TS 38.212;

for $\overline{L}_{max} = 64$, the UE determines the 3 MSB bit of the candidate SS/PBCH block index from PBCH payload bits $\bar{a}_{\bar{A}+5}$, $\bar{a}_{\bar{A}+6}$, $\bar{a}_{\bar{A}+7}$ as described in TS 38.212;

A UE can be provided per serving cell by ssb-periodicityServingCell a periodicity of the half frames for reception of the SS/PBCH blocks for the serving cell. If the UE is not configured a periodicity of the half frames for receptions of the SS/PBCH blocks, the UE assumes a periodicity of a half frame. A UE assumes that the periodicity is same for all SS/PBCH blocks in the serving cell.

For initial cell selection, a UE may assume that half frames with SS/PBCH blocks occur with a periodicity of 2 frames.

For operation without shared spectrum channel access, an SS/PBCH block index is same as a candidate SS/PBCH block index.

For operation with shared spectrum channel access, a UE assumes that transmission of SS/PBCH blocks in a half frame is within a discovery burst transmission window that starts from the first symbol of the first slot in a half-frame. The UE can be provided per serving cell by DiscoveryBurst-WindowLength-r 16 a duration of the discovery burst transmission window. If DiscoveryBurst-WindowLength-r 16 is not provided, the UE assumes that the duration of the discovery burst transmission window is a half frame. For a serving cell, the UE assumes that a periodicity of the discovery burst transmission window is same as a periodicity of half frames for receptions of SS/PBCH blocks in the serving cell. The UE assumes that one or more SS/PBCH blocks indicated by ssb-PositionsInBurst may be transmitted within the discovery burst transmission window and have candidate SS/PBCH blocks indexes corresponding to SS/PBCH block indexes provided by ssb-PositionsInBurst . If MSB k, k≥1, of ssb-PositionsInBurst is set to 1, the UE assumes that one or more SS/PBCH blocks within the discovery burst transmission window with candidate SS/PBCH block indexes corresponding to SS/PBCH block index equal to k−1 may be transmitted; if MSB k is set to 0, the UE assumes that the SS/PBCH block(s) are not transmitted.

For operation with shared spectrum channel access, a UE assumes that SS/PBCH blocks in a serving cell that are within a same discovery burst transmission window or across discovery burst transmission windows are quasi co-located with respect to average gain, QCL-TypeA, and QCL-TypeD properties, when applicable (e.g., as described in TS 38.214), if a value of $(N_{DM-RS}^{PBCH} \bmod N_{SSB}^{QCL})$ is same among the SS/PBCH blocks. $N_{DM-RS}^{PBCH}$ is an index of a DM-RS sequence transmitted in a PBCH of a corresponding SS/PBCH block, and $N_{SSB}^{QCL}$ is either provided by ssbPositionQCL-Relationship-r16 or, if ssbPositionQCL-Relationship-r16 is not provided, obtained from a MIB provided by a SS/PBCH block according to Table 1 below. ssbSubcarrierSpacingCommon indicates SCS of RMSI only for the case of "operation without shared spectrum." The UE assumes that within a discovery burst transmission window, a number of transmitted SS/PBCH blocks on a serving cell is not larger than $N_{SSB}^{QCL}$. The UE can determine an SS/PBCH block index according to $(N_{DM-RS}^{PBCH} \bmod N_{SSB}^{QCL})$, or according to $(\bar{\iota} \bmod N_{SSB}^{QCL})$ where $\bar{\iota}$ is the candidate SS/PBCH block index.

TABLE 1

Mapping between the combination of subCarrierSpacingCommon and [spare or LSB of ssb-SubcarrierOffset] to N_SSB^QCL

| subCarrierSpacingCommon | [spare or LSB of ssb-SubcarrierOffset] | $N_{SSB}^{QCL}$ |
|---|---|---|
| scs15or60 | 0 | 1 |
| scs15or60 | 1 | 2 |
| scs30or120 | 0 | 4 |
| scs30or120 | 1 | 8 |

Upon detection of a SS/PBCH block, the UE determines from MIB that a CORESET for Type0-PDCCH CSS set, as described in Clause 13 of TS 38.211, is present if $k_{SSB} \leq 23$ for FR1 or if $k_{SSB} \leq 11$ for FR2. The UE determines from MIB that a CORESET for Type0-PDCCH CSS set is not present if $k_{SSB} > 23$ for FR1 or if $k_{SSB} > 11$ for FR2; the CORESET for Type0-PDCCH CSS set may be provided by PDCCH-ConfigCommon.

For a serving cell without transmission of SS/PBCH blocks, a UE acquires time and frequency synchronization with the serving cell based on receptions of SS/PBCH blocks on the PCell, or on the PSCell, of the cell group for the serving cell.

For beam-based operation, the base station may employ beam sweeping, transmitting beams in different directions. 3GPP Release-15, for example, allows 4 beams up to 3 GHz and 8 beams beyond 3 GHz in FR1. For FR2, the base station may employ up to 64 beams. With beam sweep operation, each beam may need to transmit its own SS/PBCH block to allow UE synchronization and enable successful DL and UL data communication.

SS/PBCH block burst spans 5 m-sec where the base station may transmit SS/PBCH blocks for active beams up to the maximum number of beams according to the operating carrier frequency. Thus, SS/PBCH blocks for active beams will always be confined within a burst of 5 m-sec. 3GPP has defined the SS/PBCH burst patterns in RANI specifications which provide the symbol indices where the base station will transmit SS/PBCH blocks. The following figure shows the burst design for 120 KHz and 240 KHz sub-carrier spacings.

Regarding Rel. 16 random access procedure, e.g., TS 38.213, prior to initiation of the physical random access procedure, Layer 1 receives from higher layers a set of SS/PBCH block indexes and provides to higher layers a corresponding set of RSRP measurements.

Prior to initiation of the physical random access procedure, Layer 1 may receive from higher layers an indication to perform a Type-1 random access procedure, as described in Clauses 8.1 through 8.4, or a Type-2 random access procedure as described in Clauses 8.1 through 8.2A.

Prior to initiation of the physical random access procedure, Layer 1 receives the following information from the higher layers:

Configuration of physical random access channel ("PRACH") transmission parameters (PRACH preamble format, time resources, and frequency resources for PRACH transmission).

Parameters for determining the root sequences and their cyclic shifts in the PRACH preamble sequence set (index to logical root sequence table, cyclic shift ($N_{CS}$), and set type (unrestricted, restricted set A, or restricted set B)).

From the physical layer perspective, the Type-1 L1 random access procedure includes the transmission of random access preamble (Msg1) in a PRACH, random access response ("RAR") message with a PDCCH/PDSCH (Msg2), and when applicable, the transmission of a PUSCH scheduled by a RAR UL grant, and PDSCH for contention resolution.

From the physical layer perspective, the Type-2 L1 random access procedure includes the transmission of random access preamble in a PRACH and of a PUSCH (MsgA) and the reception of a RAR message with a PDCCH/PDSCH (MsgB), and when applicable, the transmission of a PUSCH scheduled by a RAR UL grant, and PDSCH for contention resolution.

If a random access procedure is initiated by a PDCCH order to the UE, a PRACH transmission is with a same SCS as a PRACH transmission initiated by higher layers.

If a UE is configured with two UL carriers for a serving cell and the UE detects a PDCCH order, the UE uses the UL/SUL indicator field value from the detected PDCCH order to determine the UL carrier for the corresponding PRACH transmission.

Regarding random access preamble, in one embodiment, physical random access procedure is triggered upon request of a PRACH transmission by higher layers or by a PDCCH order. A configuration by higher layers for a PRACH transmission includes the following:

A configuration for PRACH transmission, e.g., as in TS 38.211;

A preamble index, a preamble SCS, $P_{PRACH, target}$, a corresponding RA-RNTI, and a PRACH resource.

A PRACH is transmitted using the selected PRACH format with transmission power, as described in Clause 7.4, on the indicated PRACH resource.

For Type-1 random access procedure, a UE is provided a number of SS/PBCH blocks associated with one PRACH occasion and a number of contention-based preambles per SS/PBCH block per valid PRACH occasion by ssb-per-RACH-OccasionAndCB-PreamblesPerSSB.

For Type-2 random access procedure with common PRACH occasions with Type-1 random access procedure, a UE is provided a number N of SS/PBCH blocks associated with one PRACH occasion by ssb-perRACH-OccasionAndCB-PreamblesPerSSB and a number R of contention-based preambles per SS/PBCH block per valid PRACH occasion by msgA-CB-PreamblesPerSSB. The R contention-based preambles per SS/PBCH block per valid PRACH occasion for Type-2 random access procedure start after the ones for Type-1 random access procedure.

For Type-2 random access procedure with separate PRACH occasions with Type-1 random access procedure, a UE is provided a number N of SS/PBCH blocks associated with one PRACH occasion and a number R of contention-based preambles per SS/PBCH block per valid PRACH occasion by ssb-perRACH-OccasionAndCB-PreamblesPerSSB-msgA when provided; otherwise, by ssb-perRACH-OccasionAndCB-PreamblesPerSSB.

If N<1, one SS/PBCH block is mapped to 1/N consecutive valid PRACH occasions and R contention-based preambles with consecutive indexes associated with the SS/PBCH block per valid PRACH occasion start from preamble index 0. If N≥1, R contention-based preambles with consecutive indexes associated with SS/PBCH block n, 0≤n≤N−1, per valid PRACH occasion start from preamble index $n \cdot N_{preamble}^{total}/N$ where $N_{preamble}^{total}$ is provided by totalNumberOfRA-Preambles for Type-1 random access procedure, or by msgA-totalNumberOfRA-Preambles for Type-2 random access procedure with separate PRACH occasions from a Type 1 random access procedure and is an integer multiple of N.

For link recovery, a UE is provided N SS/PBCH blocks associated with one PRACH occasion by ssb-perRACH-Occasion in BeamFailureRecoveryConfig. For a dedicated RACH configuration provided by RACH-ConfigDedicated, if cfra is provided, a UE is provided N SS/PBCH blocks associated with one PRACH occasion by ssb-perRACH-Occasion in occasions. If N<1, one SS/PBCH block is mapped to 1/N consecutive valid PRACH occasions. If N≥1, all consecutive N SS/PBCH blocks are associated with one PRACH occasion.

SS/PBCH block indexes provided by ssb-PositionsInBurst in SIB1 or in ServingCellConfigCommon are mapped to valid PRACH occasions in the following order where the parameters are described in TS 38.211.

First, in increasing order of preamble indexes within a single PRACH occasion;

Second, in increasing order of frequency resource indexes for frequency multiplexed PRACH occasions;

Third, in increasing order of time resource indexes for time multiplexed PRACH occasions within a PRACH slot;

Fourth, in increasing order of indexes for PRACH slots.

An association period, starting from frame 0, for mapping SS/PBCH blocks to PRACH occasions is the smallest value in the set determined by the PRACH configuration period according Table 2 below such that $N_{Tx}^{SSB}$ SS/PBCH blocks are mapped at least once to the PRACH occasions within the association period, where a UE obtains $N_{Tx}^{SSB}$ from the value of ssb-PositionsInBurst in SIB1 or in ServingCellConfigCommon. If after an integer number of SS/PBCH blocks to PRACH occasions mapping cycles within the association period there is a set of PRACH occasions that are not mapped to $N_{Tx}^{SSB}$ SS/PBCH blocks, no SS/PBCH blocks are mapped to the set of PRACH occasions. An association pattern period includes one or more association periods and is determined so that a pattern between PRACH occasions and SS/PBCH blocks repeats at most every 160 msec. PRACH occasions not associated with SS/PBCH blocks after an integer number of association periods, if any, are not used for PRACH transmissions.

For a PRACH transmission triggered by a PDCCH order, the PRACH mask index field, e.g., as in TS 38.212, if the value of the random access preamble index field is not zero, indicates the PRACH occasion for the PRACH transmission where the PRACH occasions are associated with the SS/PBCH block index indicated by the SS/PBCH block index field of the PDCCH order.

For a PRACH transmission triggered by higher layers, if ssb-ResourceList is provided, the PRACH mask index is indicated by ra-ssb-OccasionMaskIndex which indicates the PRACH occasions for the PRACH transmission where the PRACH occasions are associated with the selected SS/PBCH block index.

The PRACH occasions are mapped consecutively per corresponding SS/PBCH block index. The indexing of the PRACH occasion indicated by the mask index value is reset per mapping cycle of consecutive PRACH occasions per SS/PBCH block index. The UE selects for a PRACH transmission the PRACH occasion indicated by PRACH mask index value for the indicated SS/PBCH block index in the first available mapping cycle.

For the indicated preamble index, the ordering of the PRACH occasions is

First, in increasing order of frequency resource indexes for frequency multiplexed PRACH occasions;
Second, in increasing order of time resource indexes for time multiplexed PRACH occasions within a PRACH slot;
Third, in increasing order of indexes for PRACH slots.

For a PRACH transmission triggered upon request by higher layers, a value of ra-OccasionList, e.g., as in TS 38.331, if csirs-ResourceList is provided, indicates a list of PRACH occasions for the PRACH transmission where the PRACH occasions are associated with the selected CSI-RS index indicated by CSI-RS. The indexing of the PRACH occasions indicated by ra-OccasionList is reset per association pattern period.

TABLE 2

Mapping between PRACH configuration period and SS/PBCH block to PRACH occasion association period

| PRACH configuration period (msec) | Association period (number of PRACH configuration periods) |
| --- | --- |
| 10 | {1, 2, 4, 8, 16} |
| 20 | {1, 2, 4, 8} |
| 40 | {1, 2, 4} |
| 80 | {1, 2} |
| 160 | {1} |

For paired spectrum all PRACH occasions are valid.
For unpaired spectrum,
if a UE is not provided tdd-UL-DL-ConfigurationCommon, a PRACH occasion in a PRACH slot is valid if it does not precede a SS/PBCH block in the PRACH slot and starts at least $N_{gap}$ symbols after a last SS/PBCH block reception symbol, where $N_{gap}$ is provided in Table 3 below.
the index of the SS/PBCH block is provided by ssb-PositionsInBurst in SIB1 or in ServingCellConfigCommon.
If a UE is provided tdd-UL-DL-ConfigurationCommon, a PRACH occasion in a PRACH slot is valid if
it is within UL symbols, or
it does not precede a SS/PBCH block in the PRACH slot and starts at least $N_{gap}$ symbols after a last downlink symbol and at least $N_{gap}$ symbols after a last SS/PBCH block symbol, where $N_{gap}$ is provided in Table 3, and if ChannelAccessType-r16=semistatic is provided, does not overlap with a set of consecutive symbols before the start of a next channel occupancy time where there shall not be any transmissions, as described in TS 37.213.
the index of the SS/PBCH block is provided by ssb-PositionsInBurst in SIB1 or in ServingCellConfigCommon.
For preamble format B4, e.g., as in TS 38.211, $N_{gap}=0$.

TABLE 3

$N_{gap}$ values for different preamble SCS μ

| Preamble SCS | $N_{gap}$ |
| --- | --- |
| 1.25 kHz or 5 kHz | 0 |
| 15 kHz or 30 kHz or 60 kHz or 120 kHz | 2 |

If a random access procedure is initiated by a PDCCH order, the UE, if requested by higher layers, transmits a PRACH in the selected PRACH occasion, as described in TS 38.321, for which a time between the last symbol of the PDCCH order reception and the first symbol of the PRACH transmission is larger than or equal to $N_{T,2}+\Delta_{BWPSwitching}+\Delta_{Delay}$ msec, where $N_{T,2}$ is a time duration of $N_2$ symbols corresponding to a PUSCH preparation time for UE processing capability 1, e.g., as in TS 38.214, assuming μ corresponds to the smallest SCS configuration between the SCS configuration of the PDCCH order and the SCS configuration of the corresponding PRACH transmission, $\Delta_{BWPSwitching}=0$ if the active UL BWP does not change and $\Delta_{BWPSwitching}$ is defined in TS 38.133 otherwise, and $\Delta_{Delay}=0.5$ msec for FR1 and $\Delta_{Delay}=0.25$ msec for FR2. For a PRACH transmission using 1.25 kHz or 5 kHz SCS, the UE determines $N_2$. assuming SCS configuration μ=0.

For single cell operation or for operation with carrier aggregation in a same frequency band, a UE does not transmit PRACH and PUSCH/PUCCH/SRS in a same slot or when a gap between the first or last symbol of a PRACH transmission in a first slot is separated by less than N symbols from the last or first symbol, respectively, of a PUSCH/PUCCH/SRS transmission in a second slot where N=2 for p=0 or μ=1, N=4 for μ=2 or μ=3, and μ is the SCS configuration for the active UL BWP.

In general, the subject matter disclosed herein describes configuring a smart repeater to efficiently amplify and forward initial access channels/signals. This disclosure describes, for example, Configuring the smart repeater with cell initial configuration parameters;
Configuring the smart repeater with SSB related timing and spatial information;
Indication to the smart repeater to apply mapping between the SSB beams sent from the base station ("BS") and SSB beams sent/forwarded by the smart repeater;
Performing and indicating SSB burst alternation in terms of SSB location and SSB beam direction; and
Configuring the smart repeater with PRACH time related parameters.

The configuration messages, in one embodiment, are assumed to be carried by a dedicated control channel for the communication between the network and the smart repeater. Both sides may use a dedicated transceiver for receiving and transmitting the repeater control information.

Several embodiments are described below that cover the above-mentioned high-level solution points. It is noted that elements/features from one or more embodiments below can be used either separately or combined, multiple smart repeaters can be deployed for a single BS, for which dedicated configuration messages are signaled by the BS, and configuration messages described in the embodiments are sent in the dedicated control link between the BS and the smart repeater and not meant for RRC configuration although they replicate similar structure of some RRC messages for SSB and PRACH.

Figure 2:
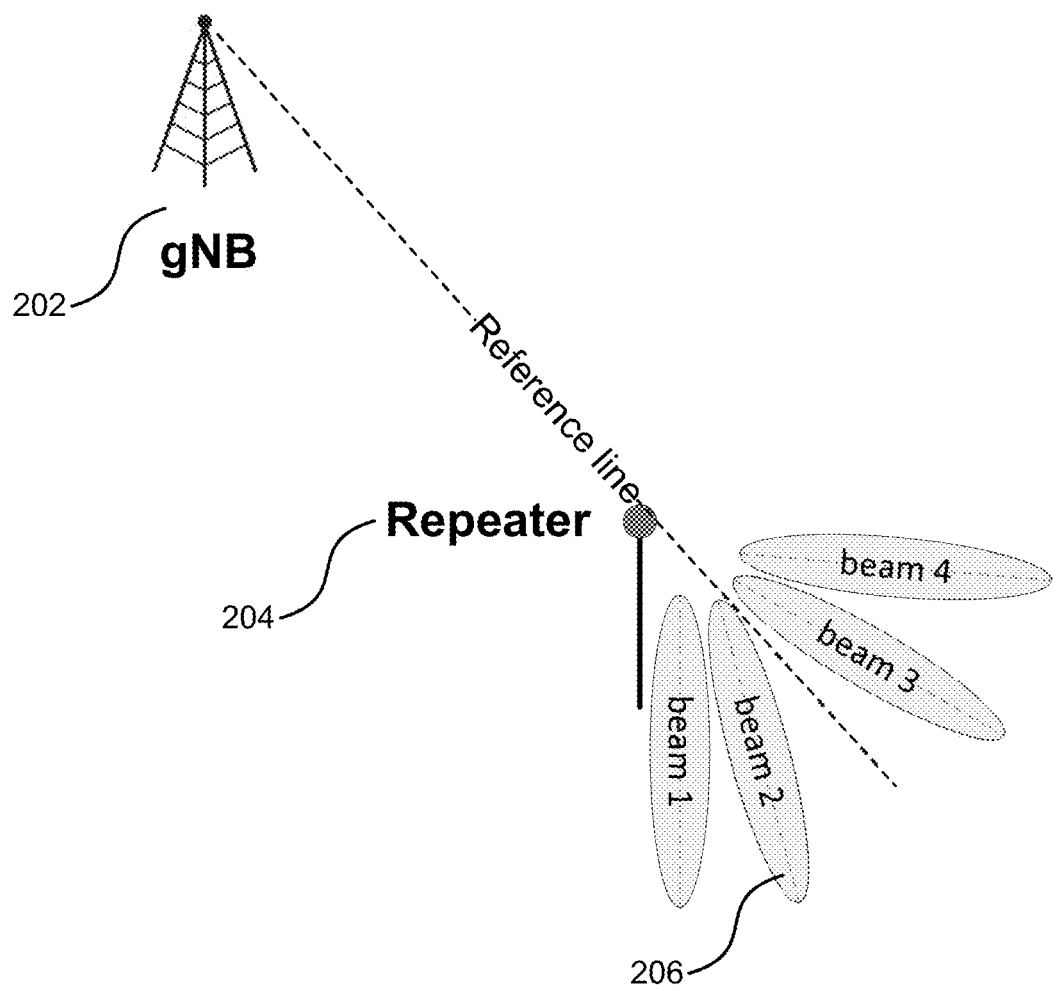
FIG. 2 is a diagram illustrating one example of configuring beams at the repeater with respect to a BS reference line.

In one embodiment referring to the initial setup configuration for a smart repeater, the smart repeater(s) receives from the BS initial setup cell configuration needed to prepare the smart repeater(s) for amplifying and forwarding initial access and other channels/signals transmission/reception. For establishing the control communication link between the network and the smart repeater, in one embodiment, BS and smart repeater may synchronize to each other by means of dedicated synchronization signal, an external synchronization source (e.g., GNSS), synchronization signals from the BS on the Uu interface, or a combination thereof. The smart repeater receives the initial setup information from the network such as:

- Frame/slot timing of the forwarded signal. This information may be an absolute time or a reference to the repeater control link timing. In a first example, the timing information is in the form of a time offset, e.g., X time units (slots, frames, or milliseconds), wherein the repeater starts forwarding the signal within X time units from receiving the configuration from the network. In some examples, the value of X is based on a Timing Advance ("TA") value of the control link uplink to the BS (e.g., the value of X may comprise a term corresponding to the TA value; the TA value term may be added to timing information (e.g., in multiple of slots, frames, milliseconds) received by the smart repeater from the BS on the control link to determine the value of X). In a second embodiment, the smart repeater is configured with a timeout parameter Y (with time unit being a slot/frame time or millisecond), wherein the repeater stops forwarding the signal after Y time units from starting the forwarding of the signal;
- The operational carrier frequency to allow the smart repeater to switch on the corresponding RF circuit;
- The power setup for a power amplifier ("PA") (e.g., transmit power setting) of the UL and DL at the smart repeater following the coverage extension requirements;
- Initial bandwidth, e.g., initial bandwidth part ("BWP") for initial access channels/signals to allow the smart repeater to switch on the suitable RF filter; Transmission ("Tx") and Reception ("Rx") spatial parameters at the smart repeater used for transmitting/receiving UL/DL channels/signals between the BS and smart repeater. This may also be pre-configured during the deployment phase. In one implementation, the pre-configuration can consist of configuring local beams at the repeater in terms of relative orientation of each of the configured beams with respect to the BS. Once the pre-configuration is done, then the repeater can simply be indicated with any of the configured beams for transmissions. An example of assigning local beams at the smart repeater in terms of orientation with respect to the BS is illustrated in FIG. 2. This beam mapping can be applied for SSB as well as other channels/signals. For transmission of SSBs or any other channels/signals from the repeater after the initial setup configuration, these pre-configured local beam IDs can be associated with each of the transmissions. For example, for serving a UE in beam 2 206, the BS, e.g., gNB 202, may indicate to the smart repeater 204 to use local beam 2 206 ID for transmission/reception of channels/signals to/from the UE.

In one implementation, these configuration parameters are sent as separate messages, each located in predefined resources in the repeater control channel on the control link between the BS and the smart repeater. In another implementation, these configuration parameters are encapsulated as an initial setup configuration structure:

```
Rep-config SEQUENCE {
    timeInfo SEQUENCE {
        FrameTiming CHOICE {t1, t2, t3, ...}
        TxTimeout    {t'1, t'2, t'3, ...}
        ...,
    }
    PowerInfo SEQUENCE {
        TxPower SEQUENCE {
            TxPower-UL CHOICE {pt1, pt2, pt3, ...}
            TxPower-DL CHOICE {pt1, pt2, pt3, ...}
        }
    FreqInfo CHOICE {
        FreqInfo-tdd SEQUENCE {
            FreqInfo-Fc CHOICE {fc1, fc2, ....}
            FreqInfo-InitBW CHOICE {bw1, bw2, bw3, ...}
        }
        FreqInfo-fdd SEQUENCE {
            FreqInfo-Fc-ul CHOICE {fc1, fc2, ....}
            InitBW-ul   CHOICE {bw1, bw2, bw3, ...}
            FreqInfo-Fc-dl CHOICE {fc1, fc2, ....}
            InitBW-dl  CHOICE {bw1, bw2, bw3, ...}
        }
    }
    ...
}
```

The smart repeater can be further indicated with DL/UL TDD switching time tdd-rep-UL-DLConfiguration. Time duration of the UL and DL slots, in one embodiment, are based on SCS that can be implicitly indicated by the configured/indicated frequency band. In one example, the SCS can be implicitly determined based on the SCS of the control communication link. In another implementation, SCS is explicitly indicated to the smart repeater as part of the initial setup configuration message.

In order to count for hardware and processing delay caused by decoding the repeater control link, the control configurations messages are sent to the smart repeater beforehand, e.g., before applying these configurations on the forwarded signal to the UEs by time t, where t>hardware and control processing delay. In one example, the repeater is not expected to receive the control configuration message within X slots/frames/milliseconds of forwarding either a DL signal from the network, an UL signal from the UE(s), or both.

Note that, in one embodiment, the repeater may be configured with two or more formats of the control configuration messages, wherein a first format corresponds to initial access configuration, and a second format corresponds to PDSCH/PUSCH transmission/reception configuration. For the latter format, information regarding the BWP(s) on which the repeater will forward the received signal(s), in either DL transmission from the network or UL transmission from UE(s) or both, may be included.

In some examples, the repeater does not expect different beam (configuration) information corresponding to the first control configuration message and the second control configuration message on overlapping symbols/time of channels/signals associated to the first control configuration message and the second control configuration on the same BWP (or possibly different BWP); in other words, the repeater expects the same beam information on overlapping symbols/time of channels/signals associated to the first control configuration message and the second control configuration on the same BWP (or possibly different BWP). In some other examples, the beam (configuration) information corresponding to the second control configuration message overrides the beam information corresponding to the first control configuration message on overlapping symbols/time of channels/signals associated to the first control configuration message and the second control configuration on the same BWP (or possibly different BWP).

In some embodiments, a repeater can be configured with multiple initial configurations corresponding to different transmit/receive points ("TRPs"). Furthermore, the repeater can be configured/indicated by TRP to apply the corresponding configuration. In one implementation, the repeater can be configured beforehand/apriori to apply corresponding configuration in a time-domain manner. For example, in first N1 time units, the repeater is activated to apply a first initial configuration and in second N2 time units, the repeater is activated to apply a second initial configuration and so on. In one implementation, when multiple initial configurations need to be configured to the repeater corresponding to different TRPs, then one primary TRP configuration is applied wherein the other TRPs and the repeaters are synchronized to the primary TRP.

In one embodiment, regarding SSB configuration indication for a smart repeater, the smart repeater(s) receives from the BS timing information related to the locations and number of SSBs in the burst and the locations of SSB bursts, and the periodicity of the SSB burst sets. These configurations allow the smart repeater to receive, amplify and forward SSB in the corresponding time slots pattern and avoid sending time information (e.g., by the BS) for each slot separately. According to Rel 15/16, depending on the requirement, the network can selectively transmit only a few SSBs in the SSB burst.

Furthermore, in one embodiment, due to the beam sweeping at the BS, the smart repeater may be able to receive one or some SSB beams. The information of the expected received SSB beams at the smart repeater is needed at the smart repeater to indicate which SSB to be forwarded. If no such indication is provided, then the repeater is expected to perform transmission according to the configuration timing information. Below is an example of a configuration message sent to the smart repeater on repeater control channel on the control link between the BS and the smart repeater:

```
Rep-ssb-config SEQUENCE {
    Rep-ssb-PositionsInBurst SEQUENCE {
        Bitmap    BIT STRING
    },
    ...
}
``` where the bitmap sequence represents which SSB needs to be forwarded and the smart repeater may be configured to forward one or more SSB beams.

The control message example below, in one embodiment, indicates that the repeater switches on its 3 GHz RF circuit (e.g., 4 SSB beams represented by bitmap length of 4) for forwarding SSB signal on time slot corresponding to SSB index 0, and switch off its RF for time slots corresponding to SSB indexes 1, 2, 3:

```
Rep-ssb-config SEQUENCE {
    Rep-ssb-PositionsInBurst SEQUENCE {
        Bitmap   = 1000
    },
    ....
}
```

Figure 3:
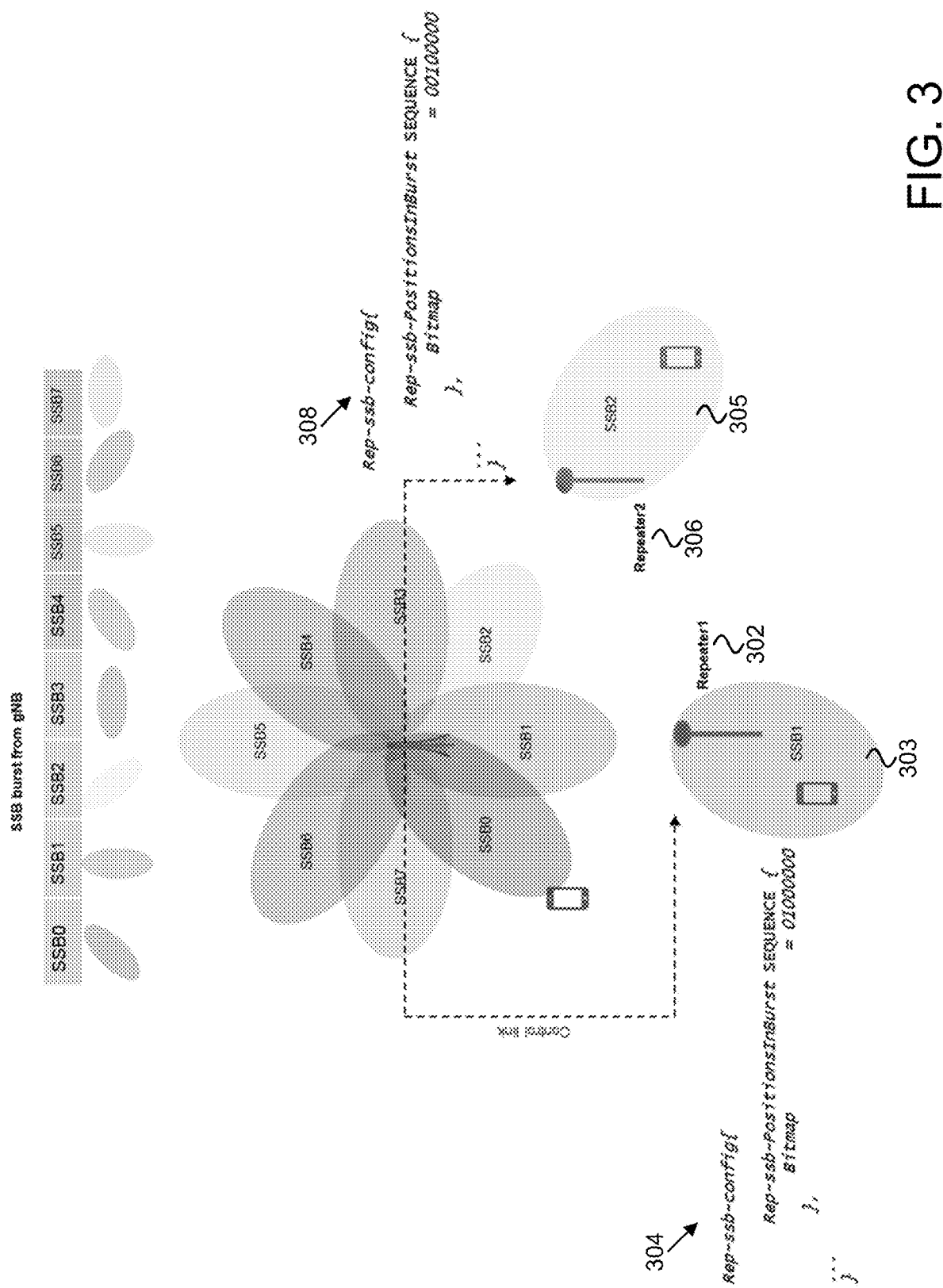
FIG. 3 is a diagram illustrating one example of SSB configuration indication to smart repeater.

In one embodiment, a smart repeater may be configured with the time location of SIB-PDSCH symbols, CORESET#0 symbols, e.g., in case of multiplexing pattern 1, and possibly configured with the gaps between each SSB and CORESET#0 to allow for silent period at the repeater (e.g., the smart repeater may achieve power savings (e.g., sleep/DTX) during the gap period). FIG. 3 shows an example of configuring the smart repeater with the SSB indexes to be forwarded. For repeater 1 302, the configuration message 304 indicates to switch on the Tx for the forwarding link at the time slot correspond to SSB index 1 303 and switch off for all other 7 SSB indexes, while the configuration message 308 for repeater 2 306 indicates to switch on at time slot corresponding to the SSB index 2 305.

In one embodiment for SSB beam direction indication for a smart repeater, a BS configures the repeater(s) with spatial information related to each SSB transmission. To allow a smart repeater to forward the received SSB beam to the intended direction, in one embodiment, the BS indicates to the smart repeater the direction or the Tx spatial information (e.g., phase shifters, TCI state) for forwarding the SSB beam. An association between the SSB beam ID transmitted from the BS and the forwarded beam ID from the repeater may be indicated for each SSB.

In another implementation, direction information can be given as an initial angle for the first SSB (e.g., for the first actual SSB transmitted by the repeater in the SSB burst) and an offset angle to the initial angle, which is applied sequentially to each activated SSBs according to the SSB bitmap string. The initial angle can be indicated as or based on an offset from a reference angle. Where the reference angle can be, for example, the line of sight ("LoS") angle between the BS and smart repeater, which can be pre-configured during the deployment phase. In another example, the initial angle may be based on the beam direction of the repeater control communication link between the BS and the repeater (e.g., receive beam or transmit beam from the repeater for the control link).

Below is an example of the repeater control message that include spatial information for forwarding SSB beams:

```
Rep-ssb-config SEQUENCE {
    Rep-ssb-PositionsInBurst SEQUENCE {
        Bitmap              bit string
    },
    Rep-ssb-SpatialInfo SEQUENCE {
        spatialInfo-flag    CHOICE {0, 1}
        InitAngle           value
        AngleOffset         value
    },
    ...
}
```

Figure 4:
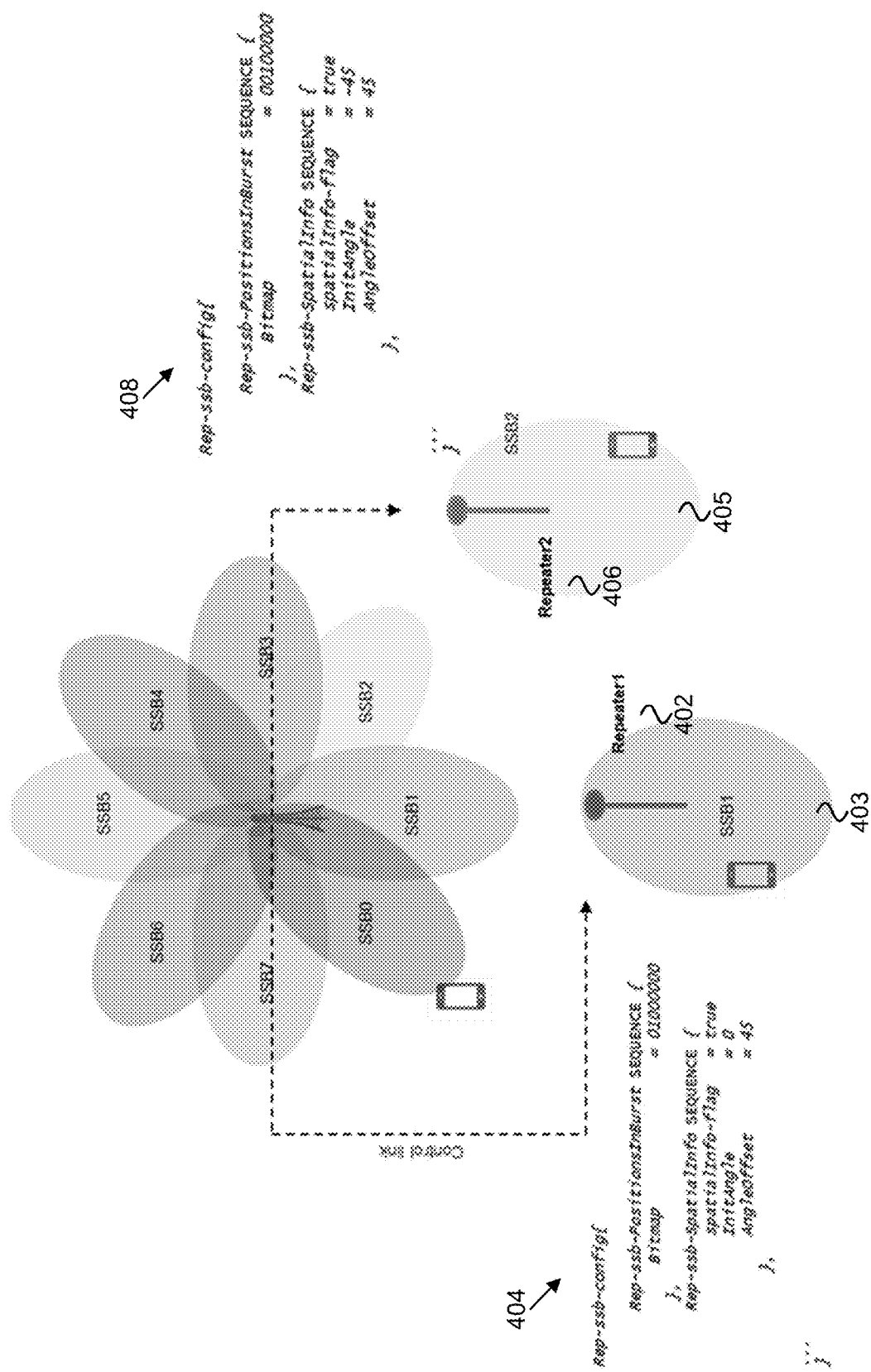
FIG. 4 is a diagram illustrating one example of SSB beam configuration indication to smart repeater.

FIG. 4 illustrates an example of configuring the smart repeater with the SSBs to be forwarded and the spatial information for each SSB. For repeater 1 402, the configuration message 404 indicates to switch on the Tx for the forwarding link at the time slot corresponds to SSB index 1 403 in the direction with no deviation from the reference angle, and switch off for all other 7 SSB indexes, while the configuration message 308 for repeater 2 406 indicates to switch on at time slot corresponds to the SSB index 2 405 and forward the SSB in a direction with deviation from the reference angle by −45 degrees.

Regarding SSB beam sweeping at a smart repeater, in one embodiment, a BS configures the smart repeater(s) with sweeping information to be performed at the smart repeater for some configured SSBs. In this case, part of the sweeping procedure is done at the smart repeater. In one embodiment, this requires a new SSB mapping structure at the BS to allow the smart repeater to perform part of the SSB beam sweeping. The BS, in one embodiment, performs the SSB beam sweeping for the configured SSB index in a burst such that some of the SSBs are grouped and sent towards the same spatial direction or applied the same spatial transmission filter. The number of the swept directions at the BS may be reduced based on the number of the grouped SSBs.

For example, for an 8 SSB beams case with a grouping factor of 2, each two consecutive SSBs are transmitted in the same direction and 4 directions are covered by the BS sweeping. The smart repeater is indicated with time information for the SSB indexes to be forwarded as well as the spatial information e.g., as the reference angle and the offset angle for each SSB to be beam swept.

Figure 5:
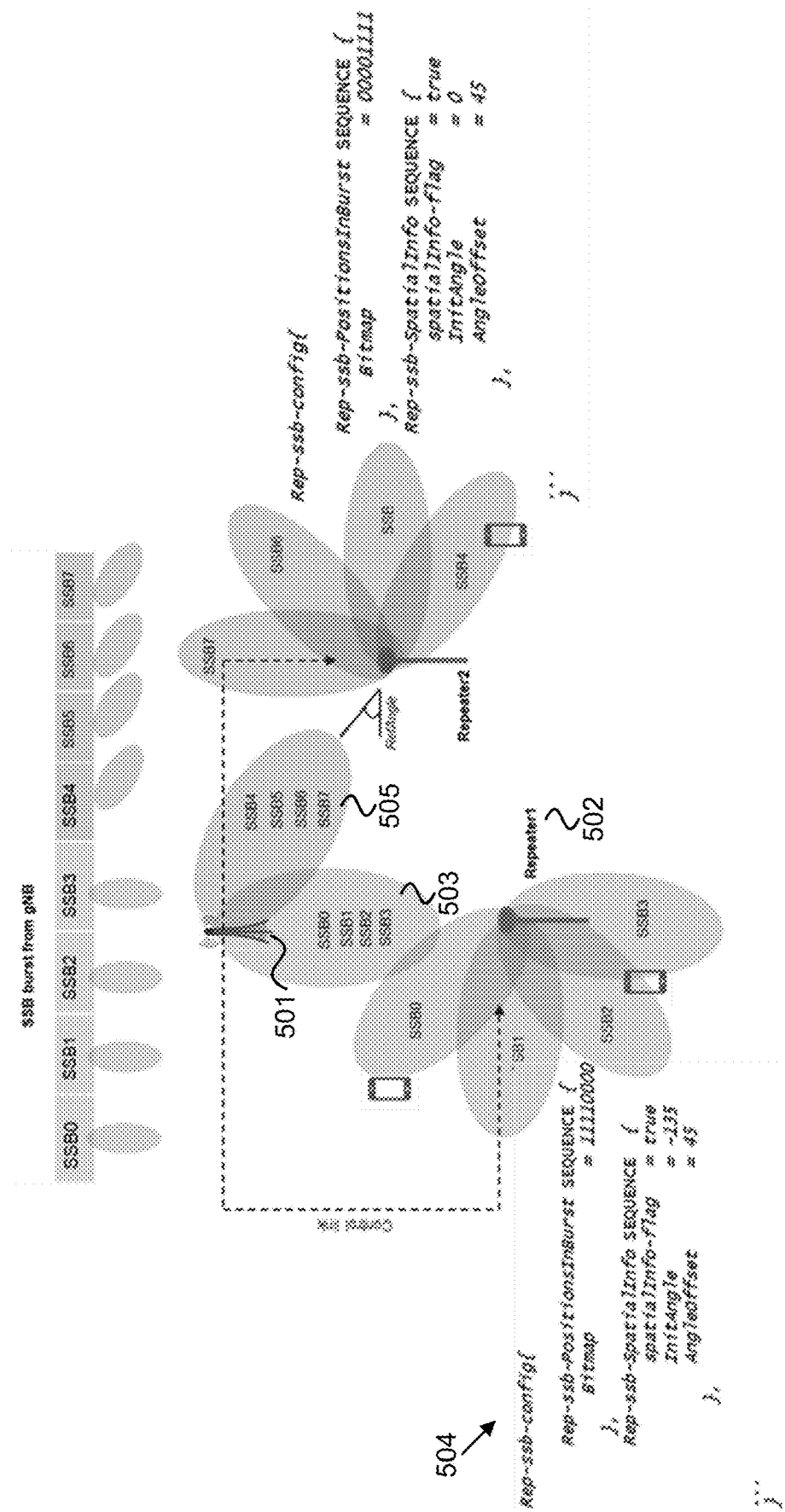
FIG. 5 is a diagram illustrating one example of SSB sweeping configuration indication to smart repeater.

The example shown in FIG. 5 describes the case of sweeping each 4 contiguous SSB at the smart repeater with SSB grouping factor 4 at the BS. SSBs 0, 1, 2, 3 503 are sent in one direction, while SSBs 4, 5, 6, 7 505 are sent in another direction by the BS 501. Repeater 1 502 is indicated with SSB configuration message 504 to activate transmission for SSBs 0,1,2,3 503 and information to perform sweeping of theses SSBs starting with angle −135 deviated from the reference angle and apply 45 degrees offset for each next SSB.

Due to the reduced number of spatial directions of SSB beams from the BS, it could happen that some close UEs to the BS cannot be covered by either the swept SSBs from the smart repeater or the swept SSB beams from the BS. To avoid this issue, the SSB configuration may be alternating for each SSB burst. For example, the direction of the grouped SSBs may change for each SSB burst and this configuration is indicated to the smart repeater.

Figure 6A:
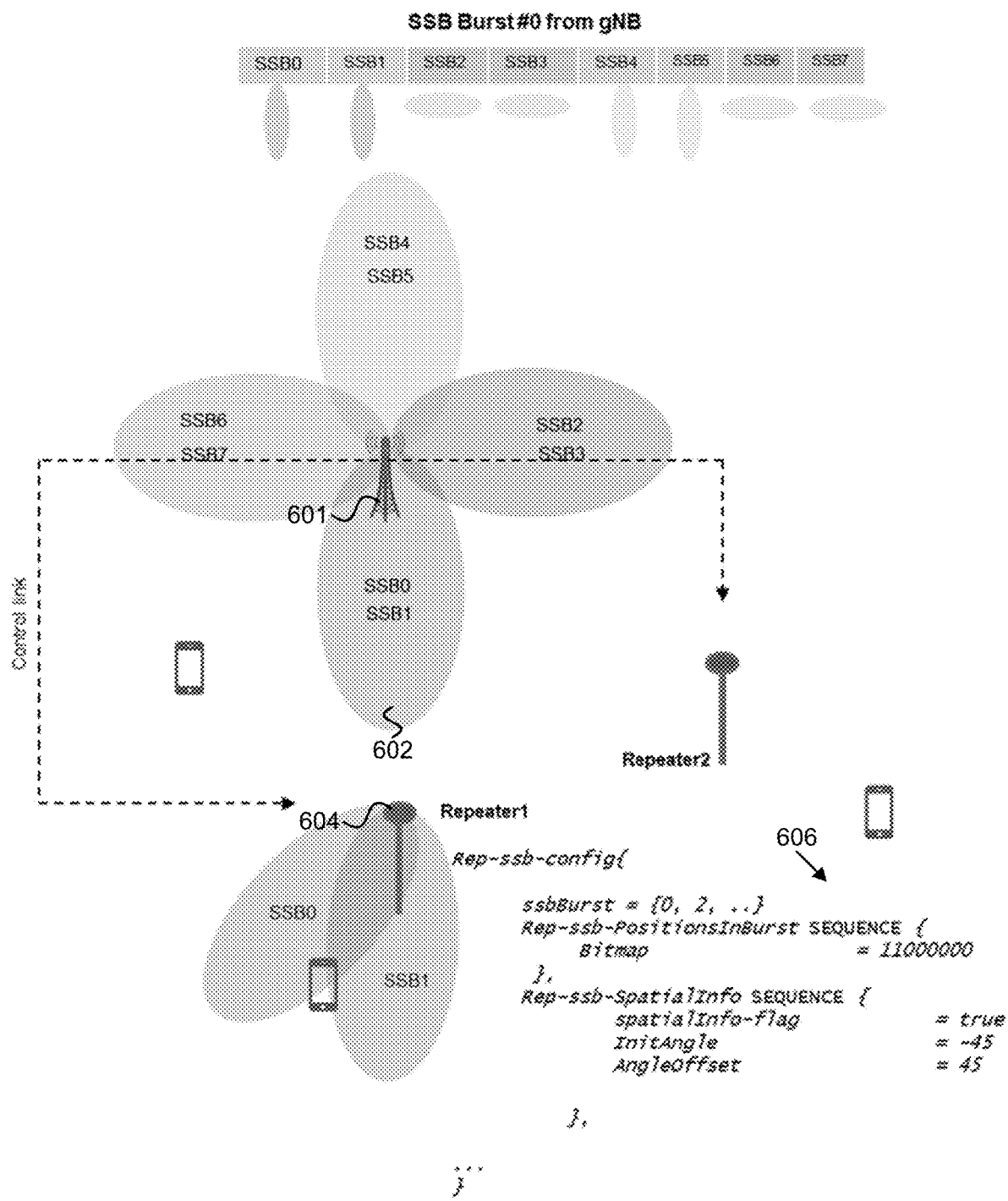
FIG. 6A is a diagram illustrating one example of SSB burst alternation.
Figure 6B:
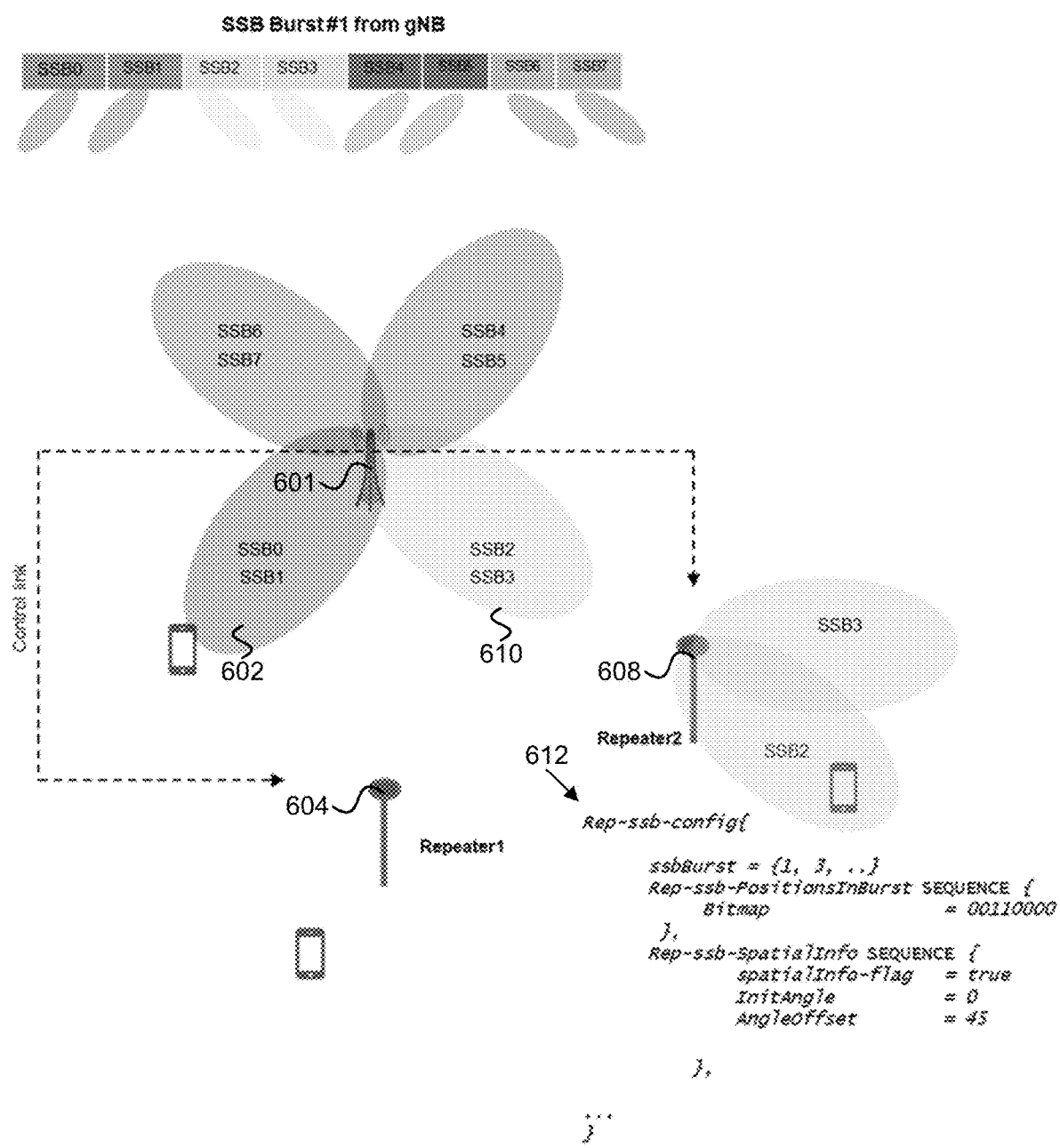
FIG. 6B is a continuation of FIG. 6A.

FIG. 6A and FIG. 6B illustrate an example of alternating 8 SSB beams for each SSB burst with SSB grouping factor 2. In the first SSB burst, shown in FIG. 6A, beams are directed in a S-E-N-W direction, while in the second burst, shown in FIG. 6B, beams are directed in a SW-SE-NE-NW direction such that SSB sweeping from the BS 601 covers the required area allowing all UEs in BS coverage to have chance for accessing the network.

As shown in FIG. 6A, in the first SSB burst the SSB 0, 1 602 are grouped together and directed to repeater 1 604. The smart repeater 604 is indicated in the configuration message 606 that for this burst to activate the transmission at SSB slots 0, 1 starting with initial angle −45 with an offset of 45 degrees for each next SSB, so that it transmits in the directions −45 and 0, while for the second burst it deactivates the transmission, and transmits again with the same configuration in SSB burst 3. Repeater 2 608 is configured, by configuration message 612, to activate transmission of SSB 2,3 610 in the odd SSB bursts and deactivate the transmission on even SSB bursts. Considering that, the smart repeater 608 may be configured, as part of the control configuration information 612, with one or more time-windows corresponding to one or more slots/milliseconds, wherein the smart repeater 608 does not process the received signal.

In one embodiment for PRACH configuration indication for a smart repeater, a BS configures the smart repeater(s) with PRACH configuration and possibly RAR window configuration (e.g., ra-Response Window: the time window to monitor RA response(s), msgB-ResponseWindow: the time window to monitor RA response(s) for 2-step RA type) to allow for switching on the Tx/Rx at specific time slots during RACH procedure. The smart repeater, in one embodiment, is configured with the TDD configuration for transmitting and receiving UL/DL channels/signals. Furthermore, in one embodiment, the smart repeater is configured with the PRACH index prach-ConfigurationIndex, which can be the same index sent in a system information block ("SIB") to the UE. The smart repeater, in one embodiment, extracts the time domain information of PRACH according to a pre-defined table stored at the smart repeater. This information includes, but is not limited to, the number of PRACH in a slot the starting symbol, subframe number, number of PRACH slots in the subframe, number of time domain PRACH occasions within PRACH slot, PRACH duration, RAR window associated with the PRACH resource where the BS may transmit a PDCCH downlink control information ("DCI") format (e.g., DCI format 1_0) with cyclic redundancy check ("CRC") scrambled by a corresponding random access ("RA")—radio network temporary identifier ("RNTI"), or the like.

In an alternative embodiment, BS configures the smart repeater with the RACH occasions to SSB mapping configuration:

```
Rep-ssb-perRACH-OccasionAndCB-PreamblesPerSSB CHOICE {
    oneEighth        ENUMERATED {n4, n8, n12,..,n64},
    oneFourth        ENUMERATED {n4, n8, n12,...,n64},
    oneHalf          ENUMERATED {n4, n8, n12,..,n64},
    one              ENUMERATED {n4, n8, n12,..,n64},
    two              ENUMERATED {n4, n8, n12,..,n32},
    four             INTEGER (1..16),
    eight            INTEGER (1..8),
    sixteen          INTEGER (1..4)
}
```

In one embodiment, this configuration indicates the RACH occasion slots mapped to each SSB, such that the smart repeater switches on its transmission/reception of PRACH at the corresponding slots associated with each SSB index. RACH occasions may be specified in time and frequency domain. However, only time domain information may be useful for the smart repeater.

Figure 7A:
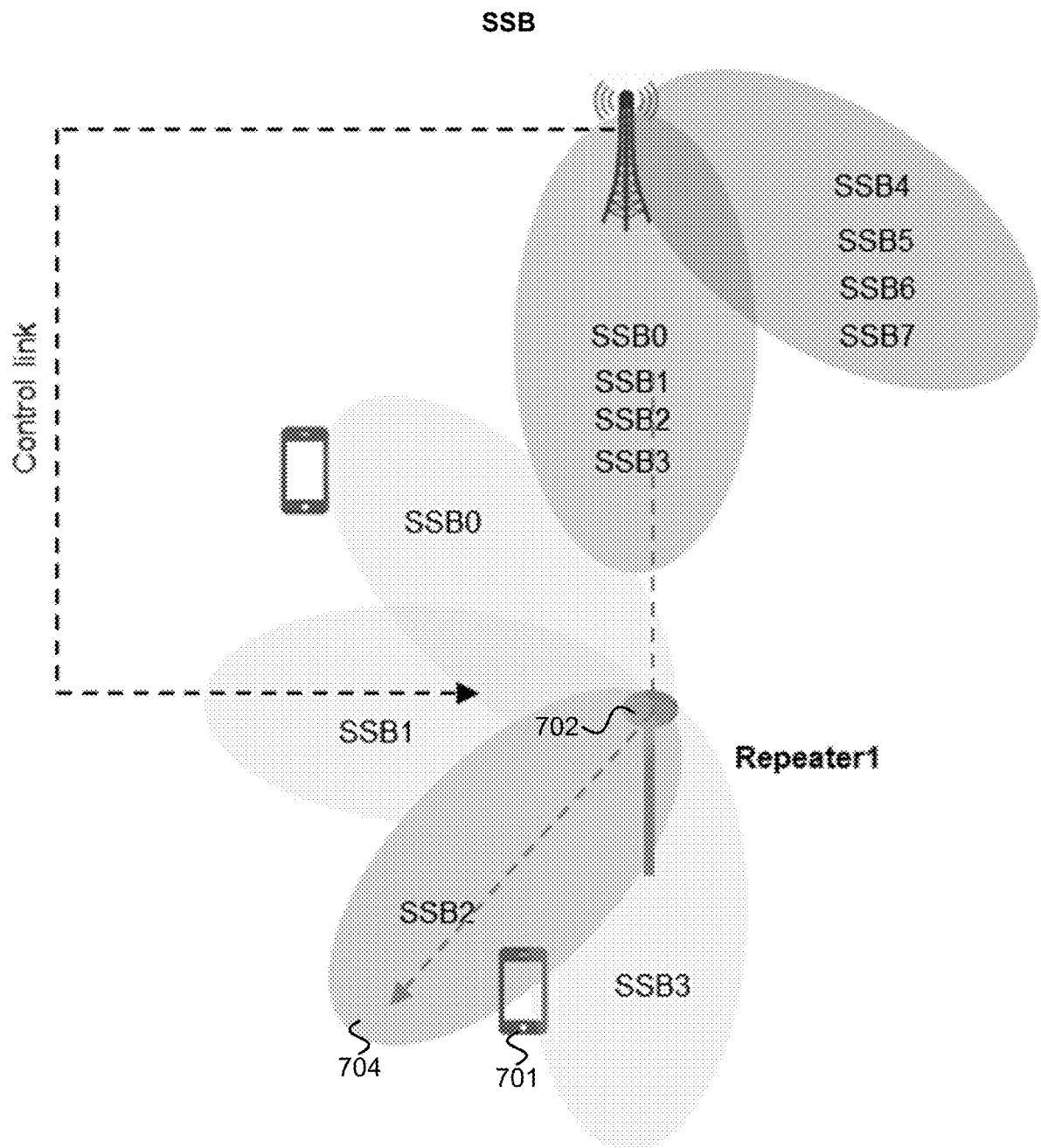
FIG. 7A is a diagram illustrating one example of the steps of RACH procedure configuration.
Figure 7B:
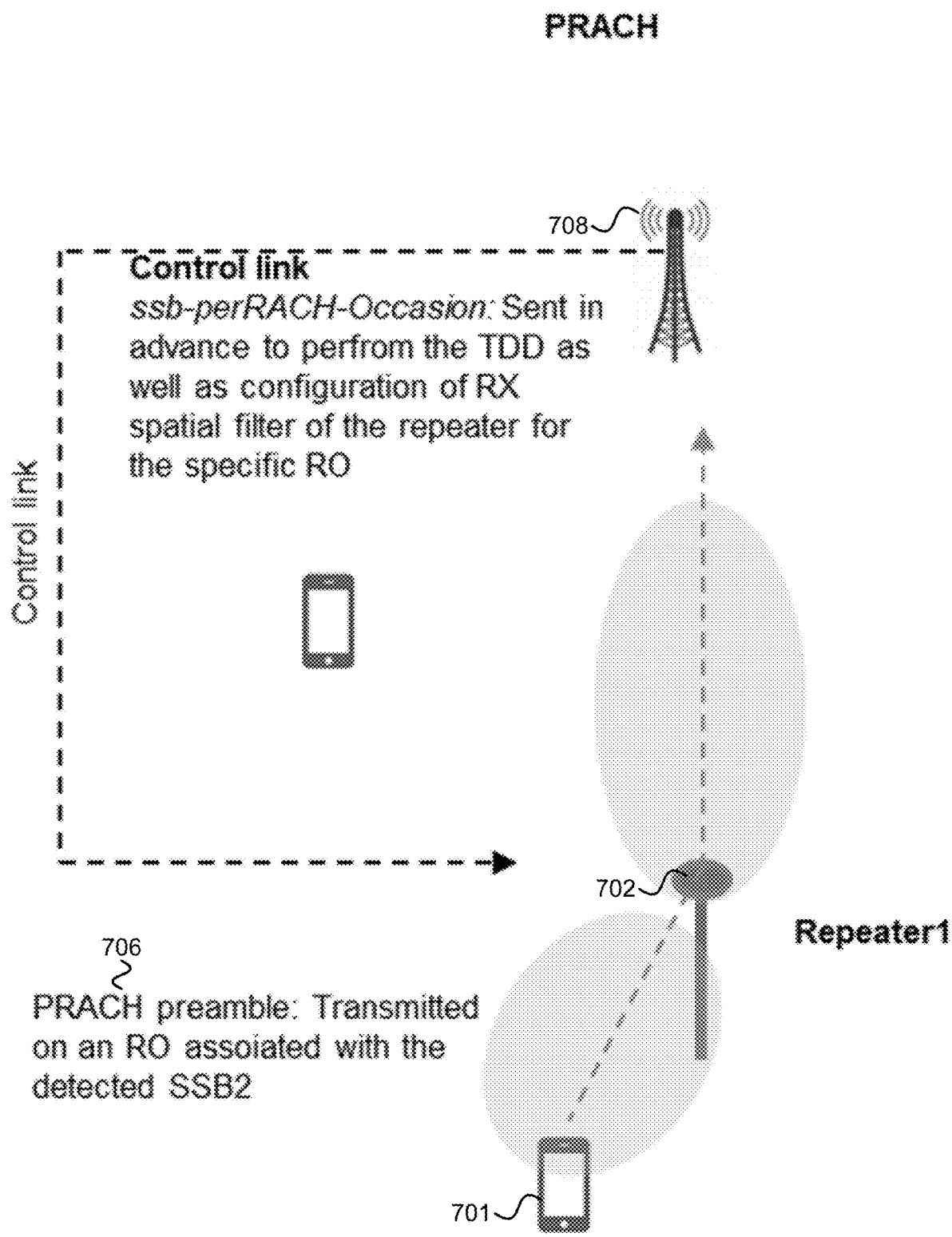
FIG. 7B is a continuation of FIG. 7A
Figure 7C:
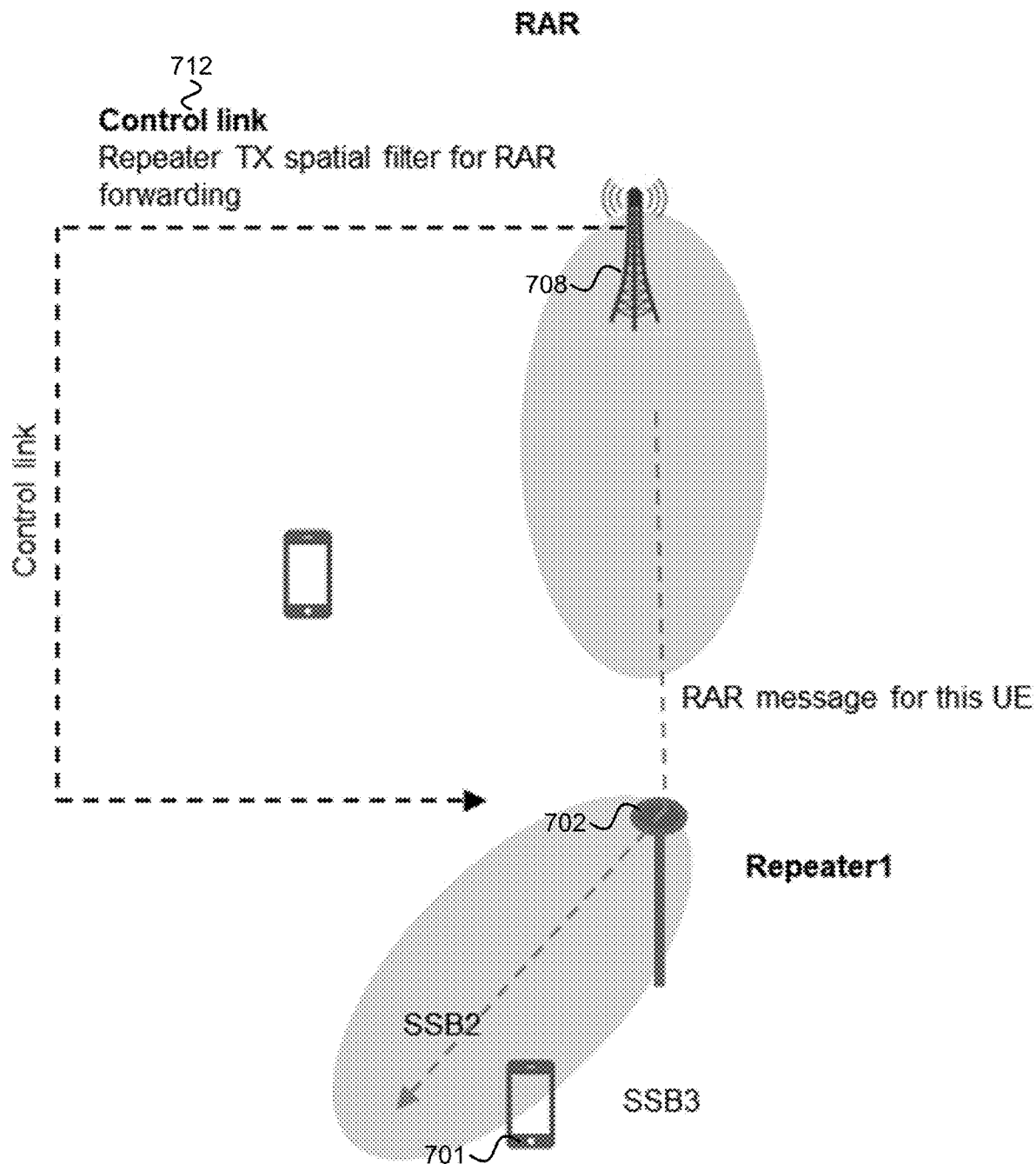
FIG. 7C is a continuation of FIGS. 7A and 7B.

FIG. 7A, FIG. 7B, and FIG. 7C show an example for the RACH procedure, in which a UE 701 detects SSB index 2 704 forwarded by repeater 1 702 and sends PRACH on a beam that corresponds to SSB 2 704. As shown in FIG. 7B, the smart repeater 702 switches on the reception/transmission of PRACH at the time slot corresponding to the RO that is associated with SSB index 2 704 and uses the Rx spatial parameters that corresponds to the Tx spatial parameters (e.g., beam correspondence) used for SSB 2 704.

In another implementation, shown in FIG. 7B, the smart repeater 702 forwards the PRACH 706 from the UE 701 to the network, e.g., BS 708, wherein the network subsequently, shown in FIG. 7C, reports control information configuration 712 to the smart repeater 702, wherein the control information includes the timing index corresponding to the order of the SSB index transmitted from the repeater 702. This control information may be periodic, e.g., with periodicity of 80 ms.

Figure 8:
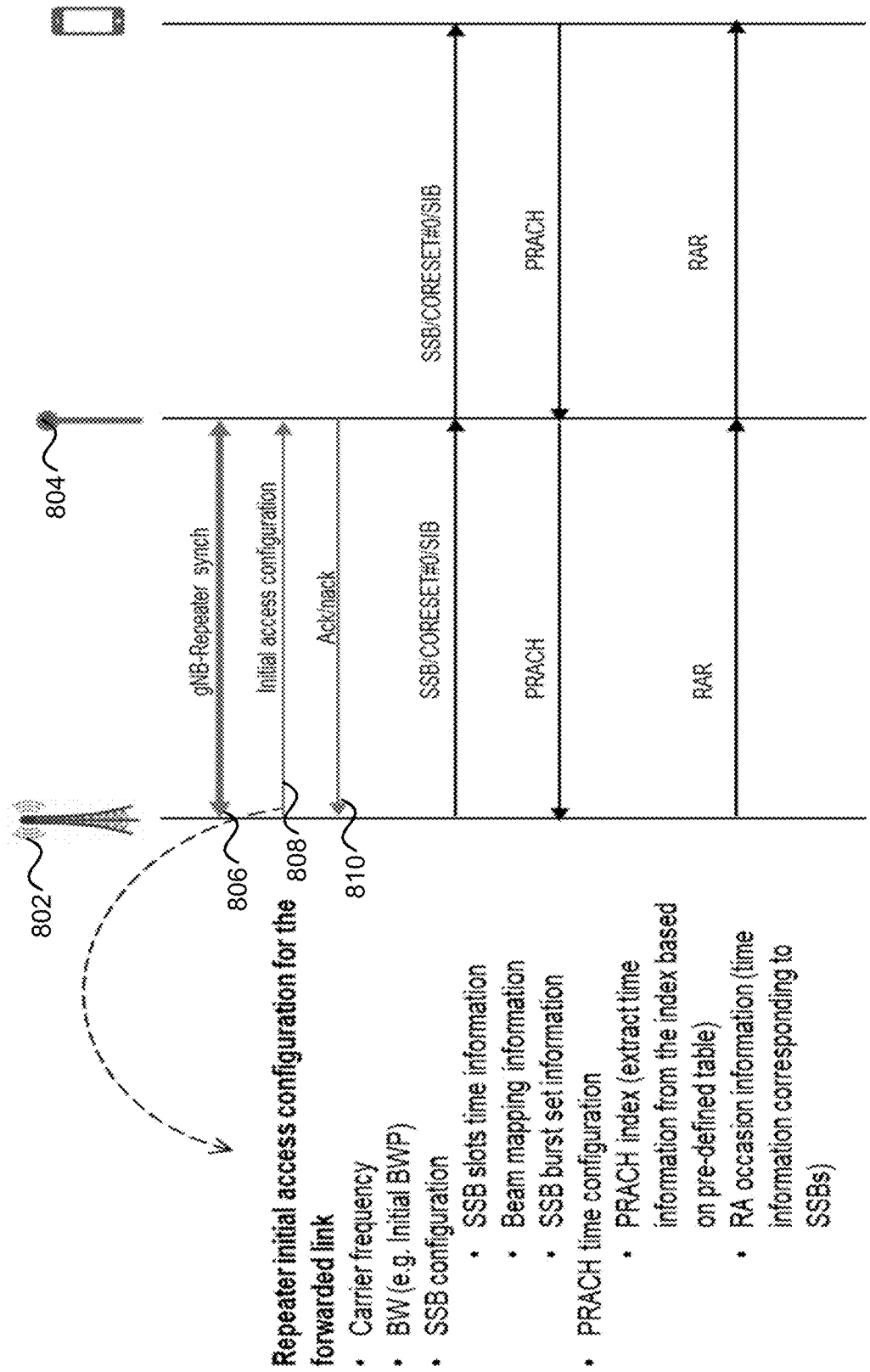
FIG. 8 is a diagram illustrating one example of a RACH procedure with the presence of smart repeater.

FIG. 8 depicts an initial access procedure with the presence of a smart repeater, including smart repeater configurations, described in the above embodiments. After synchronization 806 with the smart repeater 804, in one embodiment, the BS 802 configures 808 the smart repeater 804 in advance, using the repeater control link, with the cell initial configuration as well as the initial access related configuration. The BS 802 may explicitly indicate to smart repeater to send feedback on reception of the configuration and consequently, and the smart repeater 804 may send 810 feedback to acknowledge the reception of these configurations. In this case, in one embodiment, if NACK feedback is received, then the BS 802 retransmits the configuration. If no feedback is received by the BS 802, in one embodiment, then the BS 802 can assume NACK. These configurations can be valid if no update is received for the BS 802.

Figure 9:
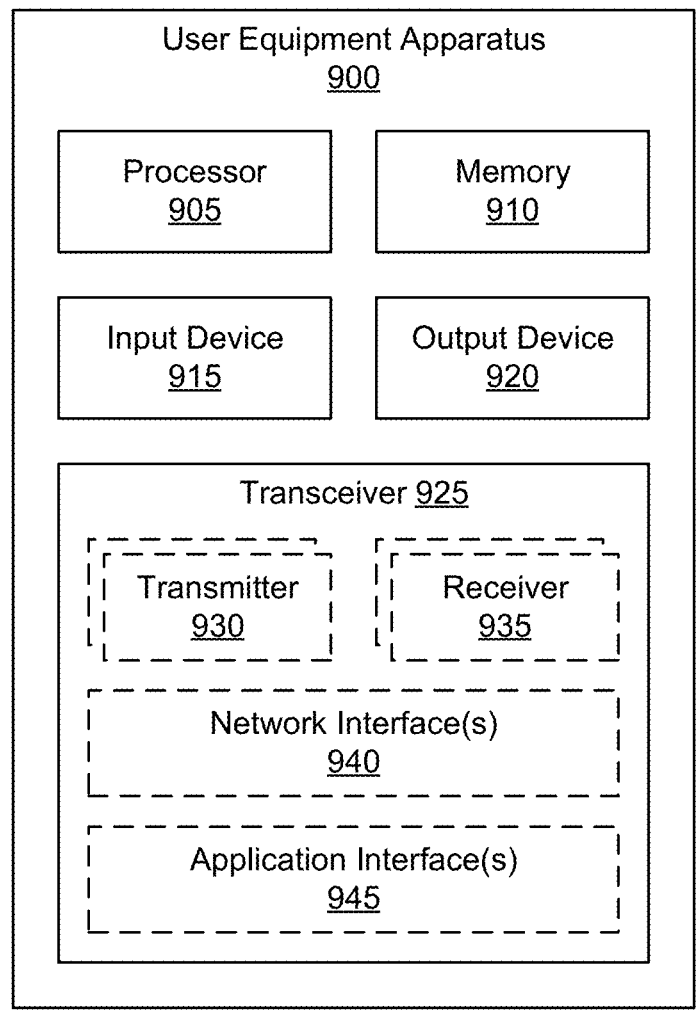
FIG. 9 is a block diagram illustrating one embodiment of a user equipment apparatus that may be used for repeater configuration for initial access.

FIG. 9 depicts a user equipment apparatus 900 that may be used for repeater configuration for initial access, according to embodiments of the disclosure. In various embodiments, the user equipment apparatus 900 is used to implement one or more of the solutions described above. The user equipment apparatus 900 may be one embodiment of the remote unit 105 and/or the UE, described above. Furthermore, the user equipment apparatus 900 may include a processor 905, a memory 910, an input device 915, an output device 920, and a transceiver 925.

In some embodiments, the input device 915 and the output device 920 are combined into a single device, such as a touchscreen. In certain embodiments, the user equipment apparatus 900 may not include any input device 915 and/or output device 920. In various embodiments, the user equipment apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. In some embodiments, the transceiver 925 communicates with one or more cells (or wireless coverage areas) supported by one or more base units 121. In various embodiments, the transceiver 925 is operable on unlicensed spectrum. Moreover, the transceiver 925 may include multiple UE panel supporting one or more beams. Additionally, the transceiver 925 may support at least one network interface 940 and/or application interface 945. The application interface(s) 945 may support one or more APIs. The network interface(s) 940 may support 3GPP reference points, such as Uu, N1, PC5, etc. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925. In certain embodiments, the processor 905 may include an application processor (also known as "main processor") which manages application-domain and operating system ("OS") functions and a baseband processor (also known as "baseband radio processor") which manages radio functions.

In various embodiments, the processor 905 and transceiver 925 control the user equipment apparatus 900 to implement the above described UE behaviors. In one embodiment, the transceiver 925 that receives an initial setup configuration from a base station of a mobile wireless communication network for establishing a forwarding link with a user equipment ("UE") device, receives an initial access configuration from the base station, the initial access configuration comprising one or more configuration parameters that allow the UE to establish access to the mobile wireless communication network, and transmits feedback to the base station that indicates reception of one or more of the initial setup configuration and the initial access configuration.

In one embodiment, at least one of the initial setup configuration and the initial access configuration is received from the base station on a dedicated control channel that is used for configuring the repeater node. In one embodiment, the initial setup configuration comprises one or more parameters for transmission power setup for downlink ("DL") and uplink ("UL") at the smart repeater.

In one embodiment, the initial setup configuration comprises one or more parameters for Uu link frame timing information as a reference to a control link timing. In one embodiment, the initial setup configuration comprises one or more parameters including an operational carrier frequency and an initial bandwidth for switching a corresponding radio frequency ("RF") circuit at the repeater node.

In one embodiment, the initial access configuration comprises one or more parameters including a Synchronization Signal Block ("SSB") configuration for switching on and off one or more of a transmission and reception radio frequency ("RF") circuit at the repeater node according to an SSB transmission.

In one embodiment, the SSB configuration comprises locations of SSB in an SSB burst and a periodicity of SSB bursts. In one embodiment, the SSB configuration comprises a bitmap for active SSBs that can be forwarded by the repeater node. In one embodiment, the SSB configuration comprises SSB beam mapping between transmitted SSB beams from the base station and forwarded SSB beams from the repeater node.

In one embodiment, spatial information of the SSB beam mapping is received as an initial angle relative to a reference angle and an offset angle applied to each forwarded SSB. In one embodiment, the SSB configuration includes an indication from the base station to perform SSB sweeping, the SSBs from the base station divided into groups such that each group of SSBs are transmitted in one spatial direction, the repeater node performing sweeping of the grouped SSBs with indicated spatial directions.

In one embodiment, the SSB configuration comprises an indication of SSB burst alternation of SSB beams such that beam mapping between transmitted SSB beams from the base station and forwarded and swept SSB beams from the repeater node is alternating for each SSB burst such that SSB beams from the repeater node and from the base station covers a required area.

In one embodiment, the initial access configuration comprises physical random access channel ("PRACH")-related time parameters for forwarding the PRACH from the UE to the base station.

In one embodiment, the PRACH configuration comprises an indication of a PRACH index, the repeater node extracting time related parameters comprising a number of PRACH slots and starting symbols according to a predefined table stored at the repeater node.

In one embodiment, the PRACH configuration comprises an indication of a random access channel ("RACH") occasion mapping to SSB such that the repeater node switches on for receiving PRACH from the UE and forwarding PRACH to the base station at corresponding time slots related to each SSB index.

In one embodiment, the initial access configuration comprises random access response ("RAR") time window configuration for monitoring the random access response such that the repeater node switches on for receiving and forwarding the RAR message during the configured time window.

In one embodiment, the transceiver 925 sends, in a repeater feedback control channel, the feedback indicating reception of one or more of the initial setup configuration and the initial access configuration. In one embodiment, the transceiver 925 sends a single feedback bit in response to receiving the initial setup configuration and another feedback bit in response to receiving the initial access configuration.

In one embodiment, the transceiver 925 receives a retransmission of one of the initial setup configuration and the initial access configuration from the base station in response to sending a negative acknowledgement ("NACK") indicating that one of the initial setup configuration and the initial access configuration is not received.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to repeater configuration for initial access. For example, the memory 910 may store various parameters, panel/beam configurations, resource assignments, policies, and the like as described above. In certain embodiments, the memory 910 also stores program code and related data, such as an operating system or other controller algorithms operating on the user equipment apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the user equipment apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all, or portions of the output device 920 may be integrated with the input device 915. For example, the input device 915 and output device 920 may form a touchscreen or similar touch-sensitive display. In other embodiments, the output device 920 may be located near the input device 915.

The transceiver 925 communicates with one or more network functions of a mobile communication network via one or more access networks. The transceiver 925 operates under the control of the processor 905 to transmit messages, data, and other signals and also to receive messages, data, and other signals. For example, the processor 905 may selectively activate the transceiver 925 (or portions thereof) at particular times in order to send and receive messages.

The transceiver 925 includes at least transmitter 930 and at least one receiver 935. One or more transmitters 930 may be used to provide UL communication signals to a base unit 121, such as the UL transmissions described herein. Similarly, one or more receivers 935 may be used to receive DL communication signals from the base unit 121, as described herein. Although only one transmitter 930 and one receiver 935 are illustrated, the user equipment apparatus 900 may have any suitable number of transmitters 930 and receivers 935. Further, the transmitter(s) 930 and the receiver(s) 935 may be any suitable type of transmitters and receivers. In one embodiment, the transceiver 925 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 925, transmitters 930, and receivers 935 may be implemented as physically separate components that access a shared hardware resource and/or software resource, such as for example, the network interface 940.

In various embodiments, one or more transmitters 930 and/or one or more receivers 935 may be implemented and/or integrated into a single hardware component, such as a multi-transceiver chip, a system-on-a-chip, an ASIC, or other type of hardware component. In certain embodiments, one or more transmitters 930 and/or one or more receivers 935 may be implemented and/or integrated into a multi-chip module. In some embodiments, other components such as the network interface 940 or other hardware components/circuits may be integrated with any number of transmitters 930 and/or receivers 935 into a single chip. In such embodiment, the transmitters 930 and receivers 935 may be logically configured as a transceiver 925 that uses one more common control signals or as modular transmitters 930 and receivers 935 implemented in the same hardware chip or in a multi-chip module.

Figure 10:
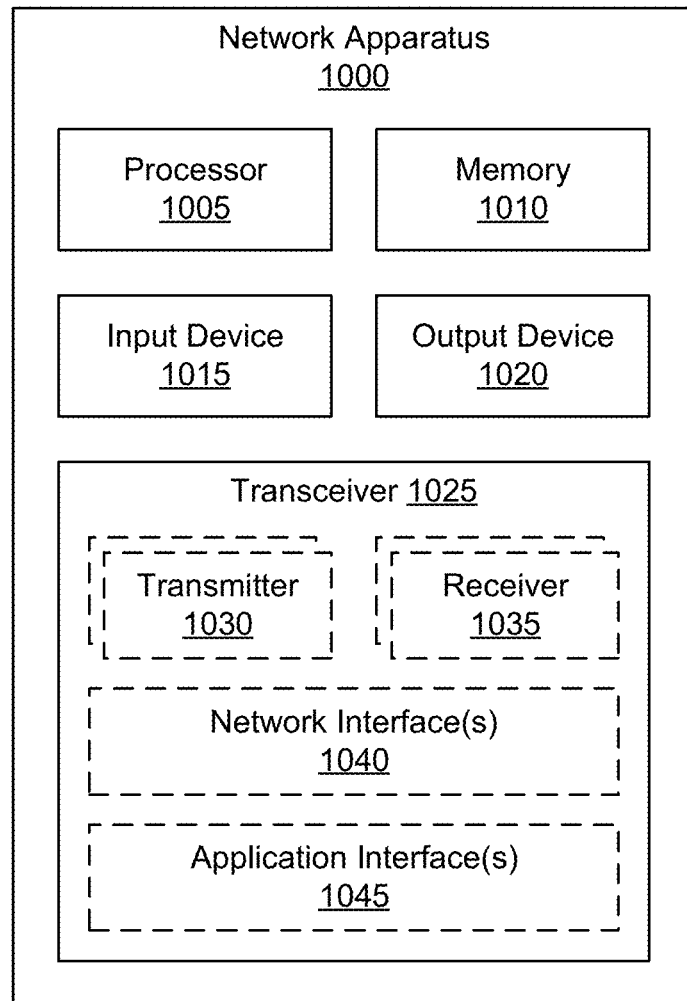
FIG. 10 is a block diagram illustrating one embodiment of a network apparatus that may be used for repeater configuration for initial access.

FIG. 10 depicts a network apparatus 1000 that may be used for repeater configuration for initial access, according to embodiments of the disclosure. In one embodiment, network apparatus 1000 may be one implementation of a RAN node, such as the base unit 121, the RAN node 210, or gNB, described above. Furthermore, the base network apparatus 1000 may include a processor 1005, a memory 1010, an input device 1015, an output device 1020, and a transceiver 1025.

In some embodiments, the input device 1015 and the output device 1020 are combined into a single device, such as a touchscreen. In certain embodiments, the network apparatus 1000 may not include any input device 1015 and/or output device 1020. In various embodiments, the network apparatus 1000 may include one or more of: the processor 1005, the memory 1010, and the transceiver 1025, and may not include the input device 1015 and/or the output device 1020.

As depicted, the transceiver 1025 includes at least one transmitter 1030 and at least one receiver 1035. Here, the transceiver 1025 communicates with one or more remote units 105. Additionally, the transceiver 1025 may support at least one network interface 1040 and/or application interface 1045. The application interface(s) 1045 may support one or more APIs. The network interface(s) 1040 may support 3GPP reference points, such as Uu, N1, N2 and N3. Other network interfaces 1040 may be supported, as understood by one of ordinary skill in the art.

The processor 1005, in one embodiment, may include any known controller capable of executing computer-readable instructions and/or capable of performing logical operations. For example, the processor 1005 may be a microcontroller, a microprocessor, a CPU, a GPU, an auxiliary processing unit, a FPGA, or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025. In certain embodiments, the processor 1005 may include an application processor (also known as "main processor") which manages application-domain and operating system ("OS") functions and a baseband processor (also known as "baseband radio processor") which manages radio function.

In various embodiments, the network apparatus 1000 is a RAN node (e.g., gNB) that includes a processor 1005 and a transceiver 1025. In one embodiment, the transceiver 1025 transmits an initial setup configuration to a repeater node for establishing a forwarding link with a user equipment ("UE") device, transmits an initial access configuration to the repeater node, the initial access configuration comprising one or more configuration parameters that allow the UE to establish access to a mobile wireless communication network via the repeater node, and receives feedback from the repeater node that indicates reception of one or more of the initial setup configuration and the initial access configuration.

The memory 1010, in one embodiment, is a computer readable storage medium. In some embodiments, the memory 1010 includes volatile computer storage media. For example, the memory 1010 may include a RAM, including dynamic RAM ("DRAM"), synchronous dynamic RAM ("SDRAM"), and/or static RAM ("SRAM"). In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media.

In some embodiments, the memory 1010 stores data related to repeater configuration for initial access. For example, the memory 1010 may store parameters, configurations, resource assignments, policies, and the like, as described above. In certain embodiments, the memory 1010 also stores program code and related data, such as an operating system or other controller algorithms operating on the network apparatus 1000.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, is designed to output visual, audible, and/or haptic signals. In some embodiments, the output device 1020 includes an electronically controllable display or display device capable of outputting visual data to a user. For example, the output device 1020 may include, but is not limited to, an LCD display, an LED display, an OLED display, a projector, or similar display device capable of outputting images, text, or the like to a user. As another, non-limiting, example, the output device 1020 may include a wearable display separate from, but communicatively coupled to, the rest of the network apparatus 1000, such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all, or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 includes at least transmitter 1030 and at least one receiver 1035. One or more transmitters 1030 may be used to communicate with the UE, as described herein. Similarly, one or more receivers 1035 may be used to communicate with network functions in the non-public network ("NPN"), PLMN and/or RAN, as described herein. Although only one transmitter 1030 and one receiver 1035 are illustrated, the network apparatus 1000 may have any suitable number of transmitters 1030 and receivers 1035. Further, the transmitter(s) 1030 and the receiver(s) 1035 may be any suitable type of transmitters and receivers.

Figure 11:
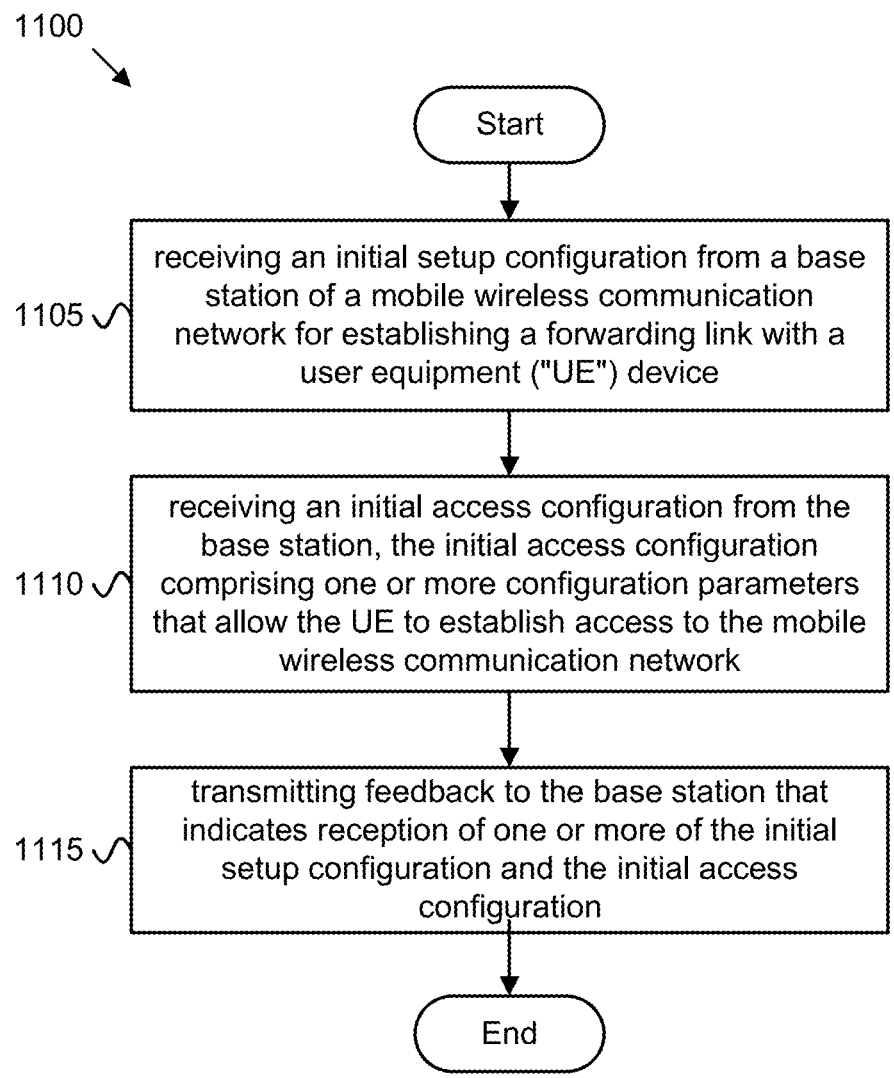
FIG. 11 is a flowchart diagram illustrating one embodiment of a method for repeater configuration for initial access.

FIG. 11 is a flowchart diagram of a method 1100 for repeater configuration for initial access. The method 1100 may be performed by a repeater node such as a network equipment apparatus 1000. In some embodiments, the method 1100 may be performed by a processor executing program code, for example, a microcontroller, a microprocessor, a CPU, a GPU, an auxiliary processing unit, a FPGA, or the like.

In one embodiment, the method 1100 includes receiving 1105 an initial setup configuration from a base station of a mobile wireless communication network for establishing a forwarding link with a user equipment ("UE") device. In one embodiment, the method 1100 includes receiving 1110 an initial access configuration from the base station, the initial access configuration comprising one or more configuration parameters that allow the UE to establish access to the mobile wireless communication network. In one embodiment, the method 1100 includes transmitting 1115 feedback to the base station that indicates reception of one or more of the initial setup configuration and the initial access configuration, and the method 1100 ends.

Figure 12:
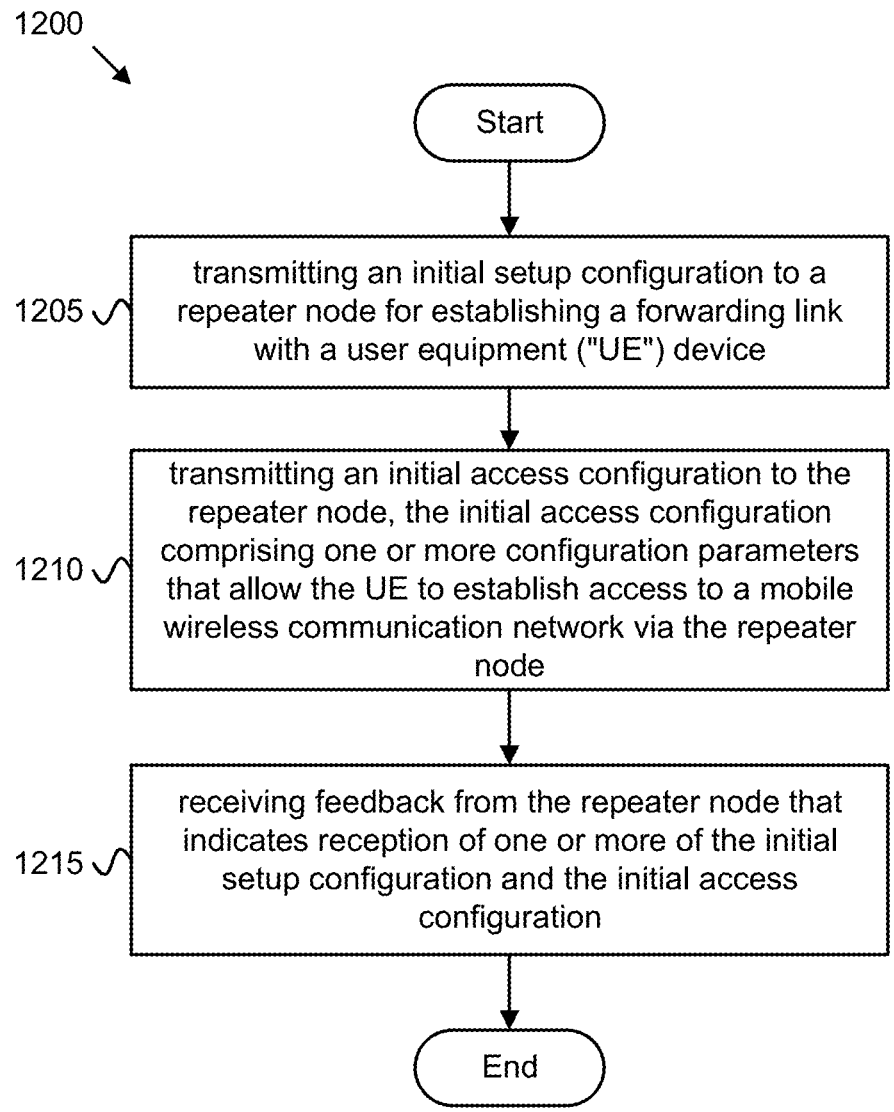
FIG. 12 is a flowchart diagram illustrating one embodiment of another method for repeater configuration for initial access.

FIG. 12 is a flowchart diagram of a method 1200 for repeater configuration for initial access. The method 1200 may be performed by a network entity such as a base node, a gNB, and/or the network equipment apparatus 1000. In some embodiments, the method 1200 may be performed by a processor executing program code, for example, a microcontroller, a microprocessor, a CPU, a GPU, an auxiliary processing unit, a FPGA, or the like.

In one embodiment, the method 1200 includes transmitting 1205 an initial setup configuration to a repeater node for establishing a forwarding link with a user equipment ("UE") device. In one embodiment, the method 1200 includes transmitting 1210 an initial access configuration to the repeater node, the initial access configuration comprising one or more configuration parameters that allow the UE to establish access to a mobile wireless communication network via the repeater node. In one embodiment, the method 1200 includes receiving 1215 feedback from the repeater node that indicates reception of one or more of the initial setup configuration and the initial access configuration, and the method 1200 ends.

A first apparatus is disclosed for repeater configuration for initial access. The first apparatus may include a repeater node such as a network equipment apparatus 1000. In some embodiments, the first apparatus includes a processor executing program code, for example, a microcontroller, a microprocessor, a CPU, a GPU, an auxiliary processing unit, a FPGA, or the like.

In one embodiment, the first apparatus includes a transceiver that receives an initial setup configuration from a base station of a mobile wireless communication network for establishing a forwarding link with a user equipment ("UE") device, receives an initial access configuration from the base station, the initial access configuration comprising one or more configuration parameters that allow the UE to establish access to the mobile wireless communication network, and transmits feedback to the base station that indicates reception of one or more of the initial setup configuration and the initial access configuration.

In one embodiment, at least one of the initial setup configuration and the initial access configuration is received from the base station on a dedicated control channel that is used for configuring the repeater node. In one embodiment, the initial setup configuration comprises one or more parameters for transmission power setup for downlink ("DL") and uplink ("UL") at the smart repeater.

In one embodiment, the initial setup configuration comprises one or more parameters for Uu link frame timing information as a reference to a control link timing. In one embodiment, the initial setup configuration comprises one or more parameters including an operational carrier frequency and an initial bandwidth for switching a corresponding radio frequency ("RF") circuit at the repeater node.

In one embodiment, the initial access configuration comprises one or more parameters including a Synchronization Signal Block ("SSB") configuration for switching on and off one or more of a transmission and reception radio frequency ("RF") circuit at the repeater node according to an SSB transmission.

In one embodiment, the SSB configuration comprises locations of SSB in an SSB burst and a periodicity of SSB bursts. In one embodiment, the SSB configuration comprises a bitmap for active SSBs that can be forwarded by the repeater node. In one embodiment, the SSB configuration comprises SSB beam mapping between transmitted SSB beams from the base station and forwarded SSB beams from the repeater node.

In one embodiment, spatial information of the SSB beam mapping is received as an initial angle relative to a reference angle and an offset angle applied to each forwarded SSB. In one embodiment, the SSB configuration includes an indication from the base station to perform SSB sweeping, the SSBs from the base station divided into groups such that each group of SSBs are transmitted in one spatial direction, the repeater node performing sweeping of the grouped SSBs with indicated spatial directions.

In one embodiment, the SSB configuration comprises an indication of SSB burst alternation of SSB beams such that beam mapping between transmitted SSB beams from the base station and forwarded and swept SSB beams from the repeater node is alternating for each SSB burst such that SSB beams from the repeater node and from the base station covers a required area.

In one embodiment, the initial access configuration comprises physical random access channel ("PRACH")-related time parameters for forwarding the PRACH from the UE to the base station.

In one embodiment, the PRACH configuration comprises an indication of a PRACH index, the repeater node extracting time related parameters comprising a number of PRACH slots and starting symbols according to a predefined table stored at the repeater node.

In one embodiment, the PRACH configuration comprises an indication of a random access channel ("RACH") occasion mapping to SSB such that the repeater node switches on for receiving PRACH from the UE and forwarding PRACH to the base station at corresponding time slots related to each SSB index.

In one embodiment, the initial access configuration comprises random access response ("RAR") time window configuration for monitoring the random access response such that the repeater node switches on for receiving and forwarding the RAR message during the configured time window.

In one embodiment, the transceiver sends, in a repeater feedback control channel, the feedback indicating reception of one or more of the initial setup configuration and the initial access configuration. In one embodiment, the transceiver sends a single feedback bit in response to receiving the initial setup configuration and another feedback bit in response to receiving the initial access configuration.

In one embodiment, the transceiver receives a retransmission of one of the initial setup configuration and the initial access configuration from the base station in response to sending a negative acknowledgement ("NACK") indicating that one of the initial setup configuration and the initial access configuration is not received.

A first method is disclosed for repeater configuration for initial access. The first method may be performed by a repeater node such as a network equipment apparatus 1000. In some embodiments, the first method may be performed by a processor executing program code, for example, a microcontroller, a microprocessor, a CPU, a GPU, an auxiliary processing unit, a FPGA, or the like.

In one embodiment, the first method includes receiving an initial setup configuration from a base station of a mobile wireless communication network for establishing a forwarding link with a user equipment ("UE") device, receiving an initial access configuration from the base station, the initial access configuration comprising one or more configuration parameters that allow the UE to establish access to the mobile wireless communication network, and transmitting feedback to the base station that indicates reception of one or more of the initial setup configuration and the initial access configuration.

In one embodiment, at least one of the initial setup configuration and the initial access configuration is received from the base station on a dedicated control channel that is used for configuring the repeater node. In one embodiment, the initial setup configuration comprises one or more parameters for transmission power setup for downlink ("DL") and uplink ("UL") at the smart repeater.

In one embodiment, the initial setup configuration comprises one or more parameters for Uu link frame timing information as a reference to a control link timing. In one embodiment, the initial setup configuration comprises one or more parameters including an operational carrier frequency and an initial bandwidth for switching a corresponding radio frequency ("RF") circuit at the repeater node.

In one embodiment, the initial access configuration comprises one or more parameters including a Synchronization Signal Block ("SSB") configuration for switching on and off one or more of a transmission and reception radio frequency ("RF") circuit at the repeater node according to an SSB transmission.

In one embodiment, the SSB configuration comprises locations of SSB in an SSB burst and a periodicity of SSB bursts. In one embodiment, the SSB configuration comprises a bitmap for active SSBs that can be forwarded by the repeater node. In one embodiment, the SSB configuration comprises SSB beam mapping between transmitted SSB beams from the base station and forwarded SSB beams from the repeater node.

In one embodiment, spatial information of the SSB beam mapping is received as an initial angle relative to a reference angle and an offset angle applied to each forwarded SSB. In one embodiment, the SSB configuration includes an indication from the base station to perform SSB sweeping, the SSBs from the base station divided into groups such that each group of SSBs are transmitted in one spatial direction, the repeater node performing sweeping of the grouped SSBs with indicated spatial directions.

In one embodiment, the SSB configuration comprises an indication of SSB burst alternation of SSB beams such that beam mapping between transmitted SSB beams from the base station and forwarded and swept SSB beams from the repeater node is alternating for each SSB burst such that SSB beams from the repeater node and from the base station covers a required area.

In one embodiment, the initial access configuration comprises physical random access channel ("PRACH")-related time parameters for forwarding the PRACH from the UE to the base station.

In one embodiment, the PRACH configuration comprises an indication of a PRACH index, the repeater node extracting time related parameters comprising a number of PRACH slots and starting symbols according to a predefined table stored at the repeater node.

In one embodiment, the PRACH configuration comprises an indication of a random access channel ("RACH") occasion mapping to SSB such that the repeater node switches on for receiving PRACH from the UE and forwarding PRACH to the base station at corresponding time slots related to each SSB index.

In one embodiment, the initial access configuration comprises random access response ("RAR") time window configuration for monitoring the random access response such that the repeater node switches on for receiving and forwarding the RAR message during the configured time window.

In one embodiment, the first method includes sending, in a repeater feedback control channel, the feedback indicating reception of one or more of the initial setup configuration and the initial access configuration. In one embodiment, the first method includes sending a single feedback bit in response to receiving the initial setup configuration and another feedback bit in response to receiving the initial access configuration.

In one embodiment, the first method includes receiving a retransmission of one of the initial setup configuration and the initial access configuration from the base station in response to sending a negative acknowledgement ("NACK") indicating that one of the initial setup configuration and the initial access configuration is not received.

A second apparatus is disclosed for repeater configuration for initial access. The second apparatus may include a network entity such as a base node, a gNB, and/or the network equipment apparatus 1000. In some embodiments, the second apparatus includes a processor executing program code, for example, a microcontroller, a microprocessor, a CPU, a GPU, an auxiliary processing unit, a FPGA, or the like.

In one embodiment, the second apparatus includes a transceiver that transmits an initial setup configuration to a repeater node for establishing a forwarding link with a user equipment ("UE") device, transmits an initial access configuration to the repeater node, the initial access configuration comprising one or more configuration parameters that allow the UE to establish access to a mobile wireless communication network via the repeater node, and receives feedback from the repeater node that indicates reception of one or more of the initial setup configuration and the initial access configuration.

A second method is disclosed for repeater configuration for initial access. The second method may be performed by a network entity such as a base node, a gNB, and/or the network equipment apparatus 1000. In some embodiments, the second method may be performed by a processor executing program code, for example, a microcontroller, a microprocessor, a CPU, a GPU, an auxiliary processing unit, a FPGA, or the like.

In one embodiment, the second method includes transmitting an initial setup configuration to a repeater node for establishing a forwarding link with a user equipment ("UE") device, transmitting an initial access configuration to the repeater node, the initial access configuration comprising one or more configuration parameters that allow the UE to establish access to a mobile wireless communication network via the repeater node, and receiving feedback from the repeater node that indicates reception of one or more of the initial setup configuration and the initial access configuration.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a repeater node, the method comprising:
receiving, from a base station, a first configuration for establishing a forwarding link with a user equipment ("UE") and for switching ON and OFF a radio frequency ("RF") circuit at the repeater node according to a synchronization signal block ("SSB") transmission, the first configuration comprising an indication to perform a beam sweep procedure associated with a set of SSBs, wherein at least a subset of the set of SSBs are received in one spatial direction without sweeping and performing the beam sweep procedure on the subset of the set of SSBs on different time resources;
receiving, from the base station, a second configuration comprising one or more parameters for the UE to establish access to a wireless network, wherein the second configuration comprises a physical random access channel ("PRACH") configuration comprising PRACH-related time parameters for forwarding the PRACH configuration from the UE to the base station; and
transmitting feedback to the base station that indicates reception of one or more of the first configuration and the second configuration.

2. The method of claim 1, wherein the first configuration comprises one or more parameters for transmission power setup for downlink ("DL") and uplink ("UL") at the repeater node.

3. The method of claim 1, wherein the first configuration comprises one or more parameters for Uu link frame timing information as a reference to a control link timing.

4. The method of claim 1, wherein the first configuration comprises one or more parameters including an operational carrier frequency and an initial bandwidth for switching a corresponding radio frequency ("RF") circuit at the repeater node.

5. The method of claim 1, wherein the first configuration comprises locations of SSB in an SSB burst and a periodicity of SSB bursts.

6. The method of claim 1, wherein the first configuration comprises a bitmap for active SSBs that can be forwarded by the repeater node.

7. The method of claim 1, wherein the first configuration comprises SSB beam mapping between transmitted SSB beams from the base station and forwarded SSB beams from the repeater node.

8. The method of claim 7, wherein spatial information of the SSB beam mapping is received as an initial angle relative to a reference angle and an offset angle applied to each forwarded SSB.

9. The method of claim 1, wherein the first configuration comprises an indication of SSB burst alternation of SSB beams such that beam mapping between transmitted SSB beams from the base station and forwarded and swept SSB beams from the repeater node is alternating for each SSB burst such that SSB beams from the repeater node and from the base station covers a required area.

10. The method of claim 1, wherein the PRACH configuration comprises an indication of a PRACH index, the repeater node extracting time related parameters comprising a number of PRACH slots and starting symbols according to a predefined table stored at the repeater node.

11. The method of claim 1, wherein the PRACH configuration comprises an indication of a random access channel ("RACH") occasion mapping to SSB such that the repeater node switches on for receiving PRACH from the UE and forwarding PRACH to the base station at corresponding time slots related to each SSB index.

12. The method of claim 1, wherein the second configuration comprises a random access response ("RAR") time window configuration for monitoring the RAR such that the repeater node switches on for receiving and forwarding the RAR during the configured time window.

13. The method in claim 1, further comprising sending, in a repeater feedback control channel, the feedback indicating reception of one or more of the first configuration and the second configuration.

14. The method in claim 13, further comprising sending a single feedback bit in response to receiving the first configuration and another feedback bit in response to receiving the second configuration.

15. The method of claim 1, further comprising receiving a retransmission of one of the first configuration and the second configuration from the base station in response to sending a negative acknowledgement ("NACK") indicating that one of the first configuration and the second configuration is not received.

16. A repeater node, comprising:
at least one memory; and
at least one processor coupled with the at least one memory and configured to cause the repeater node to:
receive, from a base station, a first configuration for establishing a forwarding link with a user equipment ("UE") and for switching ON and OFF a radio frequency ("RF") circuit at the repeater node according to a synchronization signal block ("SSB") transmission, the first configuration comprising an indication to perform a beam sweep procedure associated with a set of SSBs, wherein at least a subset of the set of SSBs are received in one spatial direction without sweeping and performing the beam sweep procedure on the subset of the set of SSBs on different time resources;
receive, from the base station, a second configuration comprising one or more parameters for the UE to establish access to a wireless network, wherein the second configuration comprises a physical random access channel ("PRACH") configuration comprising PRACH-related time parameters for forwarding the PRACH configuration from the UE to the base station; and
transmit feedback to the base station that indicates reception of one or more of the first configuration and the second configuration.

17. A base station, comprising:
at least one memory; and
at least one processor coupled with the at least one memory and configured to cause the base station to:
transmit, to a repeater node, a first configuration for establishing a forwarding link with a user equipment ("UE") and for switching ON and OFF a radio frequency ("RF") circuit at the repeater node according to a synchronization signal block ("SSB") transmission, the first configuration comprising an indication to perform a beam sweep procedure associated with a set of SSBs, wherein at least a subset of the set of SSBs are received in one spatial direction without sweeping and performing the beam sweep procedure on the subset of the set of SSBs on different time resources;

transmit, to the repeater node, a second configuration comprising one or more parameters for the UE to establish access to a wireless network via the repeater node, wherein the second configuration comprises a physical random access channel ("PRACH") configuration comprising PRACH-related time parameters for forwarding the PRACH configuration from the UE to the base station; and receive feedback from the repeater node that indicates reception of one or more of the first configuration and the second configuration.

* * * * *